US007101939B2

(12) United States Patent
Nowlin et al.

(10) Patent No.: US 7,101,939 B2
(45) Date of Patent: Sep. 5, 2006

(54) ETHYLENE/α-OLEFIN COPOLYMER MADE WITH A NON-SINGLE-SITE/SINGLE-SITE CATALYST COMBINATION, ITS PREPARATION AND USE

(75) Inventors: Thomas Edward Nowlin, West Windsor, NJ (US); Pradeep P. Shirodkar, Kingwood, TX (US); Robert Ivan Mink, Tarrytown, NY (US); Gary M. Diamond, San Jose, CA (US); Jill Helaine Paul, Whitehouse Station, NJ (US); Lawrence T. Kale, Bethel Park, PA (US); Keith Dackson, East Aurora, NY (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 27 days.

(21) Appl. No.: 10/497,249

(22) PCT Filed: Oct. 11, 2002

(86) PCT No.: PCT/US02/32806

§ 371 (c)(1),
(2), (4) Date: Nov. 3, 2004

(87) PCT Pub. No.: WO03/048213

PCT Pub. Date: Jun. 12, 2003

(65) Prior Publication Data

US 2005/0054791 A1 Mar. 10, 2005

Related U.S. Application Data

(60) Provisional application No. 60/334,566, filed on Nov. 30, 2001.

(51) Int. Cl.
C08F 4/44 (2006.01)
C08F 4/642 (2006.01)
C08F 210/16 (2006.01)

(52) U.S. Cl. .................. 526/114; 526/113; 526/118; 526/119; 526/348; 526/348.1; 526/348.5; 525/240; 428/500

(58) Field of Classification Search .............. 526/113, 526/114, 118, 119; 525/240
See application file for complete search history.

(56) References Cited

U.S. PATENT DOCUMENTS

| | | | |
|---|---|---|---|
| 2,924,593 A | 2/1960 | Breslow | 260/94.9 |
| 3,135,809 A | 6/1964 | Bosmajian | 260/650 |
| 3,242,099 A | 3/1966 | Manyik et al. | 252/429 |
| 3,950,269 A | 4/1976 | Setterquist | 252/430 |
| 4,188,470 A | 2/1980 | Collina et al. | 526/64 |
| 4,299,936 A | 11/1981 | Candlin et al. | 526/119 |
| 4,310,648 A | 1/1982 | Shipley et al. | 526/114 |
| 4,324,691 A | 4/1982 | Hartshorn et al. | 252/429 B |

(Continued)

FOREIGN PATENT DOCUMENTS

| | | |
|---|---|---|
| EP | 0286177 | 10/1988 |
| EP | 0516458 | 4/1992 |
| EP | 0515132 | 5/1992 |
| WO | WO 95/13871 | 5/1995 |

OTHER PUBLICATIONS

Stephen Brunauer, et al., "Adsorption of Gases in Multimolecular Layers", Journal of American Science, vol. 60, pp. 309–319, Feb. 1938.
T.E. Nowlin, et al., "High Activity Ziegler–Natta Catalysts for the Preparation of Ethylene Copolymers," Journal of Polymer Science: Part A: Polymer Chemistry, vol. 26, pp. 755–764, 1988.
G.G. Hlatky, "Heterogenous Single–Site Catalysts for Olefin Polymerization," American Chemical Society, Chemical Review, vol. 100, pp. 1347–1376, 2000.
S.D. Ittel, et al., "Late–Metal Catalysts for Ethylene Homo–and Copolymerization," American Chemical Society, Chemical Review, vol. 100, pp. 1169–1203, 2000.
G.J.P. Britovsek, et al., "The Search for New–Generation Olefin Polymerization Catalysts: Life beyond Metallocenes," Angew. Chem. Int. Ed., vol. 38 , pp. 428–447, 1999.
T. E. Nowlin, et al., "Ziegler–Natta Catalysts on Silica for Ethylene Polymerization," Journal of Polymer Science: Part A: Polymer Chemistry, vol. 29, pp. 1167–1173, 1991.
Kyung–Jun Chu et al. "Variation of Molecular Weight Distribution (MWD) and Short Chain Branching Distribution (SCBD) of Ethylene / 1–Hexene Copolymers Produced with Different in–situ Supported Metallocene Catalysts" Macromolecular Chemistry and Physics, 201(3), p. 340–348 (2000).
C. Gabriel et al. "Comparsion of Different Methods for the Investigation of the Short–Chain Branching Distribution of LLDPE" Polymer, Elsevier Science Publishers B.V., vol. 42, No. 1, pp. 297–303 (Jan. 2001).
J. D. Kim et al. "Copolymerization of Ethylene and 1–Hexene with Supported Metallocene Catalysts: Effect of Support Treatment" Macromolecular: Rapid Communications, Wiley VCH, vol. 20, No. 6, , pp. 347–350 (Jun. 1999).
Kaminsky et al, "Extreme Bond Angle Distortion in Organozirconium Compounds Active Towards Ethylene" Angew. Chem. Int. Ed. Engl. vol. 15 (1976), p. 629.

(Continued)

Primary Examiner—Roberto Rabago
(74) Attorney, Agent, or Firm—Andrew B. Griffis; Amy C. Trexler

(57) ABSTRACT

An ethylene/α-olefin copolymer comprising a component produced by a non-single-site polymerization catalyst and a component produced by a single-site polymerization catalyst, its preparation and use are described. The copolymer has an α-olefin content of 5 to 20 percent by weight and shows at least two CRYSTAF peak temperatures differing by at least 15° C. and/or at least two DSC melting peak temperatures differing by at least 15° C.

52 Claims, 8 Drawing Sheets

U.S. PATENT DOCUMENTS

| | | | |
|---|---|---|---|
| 4,329,252 A | 5/1982 | Gavens et al. | 252/429 B |
| 4,338,424 A | 7/1982 | Morita et al. | 526/65 |
| 4,356,111 A | 10/1982 | Shipley et al. | 252/429 B |
| 4,399,053 A | 8/1983 | Shipley et al. | 252/429 B |
| 4,402,861 A | 9/1983 | Hoff | 252/429 B |
| 4,404,344 A | 9/1983 | Sinn et al. | 526/160 |
| 4,414,369 A | 11/1983 | Kuroda et al. | 526/65 |
| 4,420,592 A | 12/1983 | Kato et al. | 526/65 |
| 4,446,288 A | 5/1984 | Hoff | 526/129 |
| 4,518,751 A | 5/1985 | Mizogami et al. | 526/114 |
| 4,525,550 A | 6/1985 | Warzelhan et al. | 526/116 |
| 4,530,914 A | 7/1985 | Ewen et al. | 502/113 |
| 4,536,484 A | 8/1985 | Lacombe et al. | 502/62 |
| 4,542,199 A | 9/1985 | Kaminsky et al. | 526/160 |
| 4,554,265 A | 11/1985 | Graves | 502/113 |
| 4,568,659 A | 2/1986 | Warzelhan et al. | 502/111 |
| 4,578,373 A | 3/1986 | Graves | 502/113 |
| 4,618,660 A | 10/1986 | Graves | 526/114 |
| 4,658,078 A | 4/1987 | Slaugh et al. | 585/512 |
| 4,659,685 A | 4/1987 | Coleman, III | 502/113 |
| 4,665,047 A | 5/1987 | Slaugh et al. | 502/108 |
| 4,701,432 A | 10/1987 | Welborn, Jr. | 502/113 |
| 4,703,094 A | 10/1987 | Raufast | 526/65 |
| 4,707,530 A | 11/1987 | Johnson | 526/129 |
| 4,710,552 A | 12/1987 | Bachl et al. | 526/116 |
| 4,752,597 A | 6/1988 | Turner | 502/104 |
| 4,769,510 A | 9/1988 | Kaminsky et al. | 585/512 |
| 4,794,096 A | 12/1988 | Ewen | 502/117 |
| 4,808,561 A | 2/1989 | Welborn, Jr. | 502/104 |
| 4,814,540 A | 3/1989 | Watanabe et al. | 585/523 |
| 4,820,786 A | 4/1989 | Bacskai | 526/152 |
| 4,871,704 A | 10/1989 | Kohara et al. | 502/114 |
| 4,874,734 A | 10/1989 | Kioka et al. | 502/104 |
| 4,897,455 A | 1/1990 | Welborn, Jr. | 526/129 |
| 4,910,272 A | 3/1990 | Marchand et al. | 526/129 |
| 4,912,075 A | 3/1990 | Chang | 502/107 |
| 4,914,253 A | 4/1990 | Chang | 585/523 |
| 4,918,038 A | 4/1990 | Samuels et al. | 502/112 |
| 4,921,825 A | 5/1990 | Kioka et al. | 502/104 |
| 4,923,833 A | 5/1990 | Kioka et al. | 502/9 |
| 4,925,821 A | 5/1990 | Chang | 502/107 |
| 4,931,517 A | 6/1990 | Fujita | 526/128 |
| 4,933,403 A | 6/1990 | Kaminsky et al. | 526/160 |
| 4,935,397 A | 6/1990 | Chang | 502/117 |
| 4,937,217 A | 6/1990 | Chang | 502/111 |
| 4,937,301 A | 6/1990 | Chang | 526/128 |
| 4,939,217 A | 7/1990 | Stricklen | 526/114 |
| 4,952,540 A | 8/1990 | Kioka et al. | 502/9 |
| 4,962,248 A | 10/1990 | Winter et al. | 585/12 |
| 4,962,262 A | 10/1990 | Winter et al. | 585/512 |
| 4,980,330 A | 12/1990 | Marchand et al. | 502/115 |
| 5,001,205 A | 3/1991 | Hoel | 526/128 |
| 5,006,500 A | 4/1991 | Chang | 502/107 |
| 5,008,228 A | 4/1991 | Chang | 502/111 |
| 5,021,595 A | 6/1991 | Datta | 556/42 |
| 5,023,388 A | 6/1991 | Luker | 585/9 |
| 5,026,797 A | 6/1991 | Takahashi | 526/124 |
| 5,032,562 A | 7/1991 | Lo et al. | 502/111 |
| 5,043,515 A | 8/1991 | Slaugh et al. | 585/512 |
| 5,049,535 A | 9/1991 | Resconi et al. | 502/117 |
| 5,055,438 A | 10/1991 | Canich | 502/117 |
| 5,057,475 A | 10/1991 | Canich et al. | 502/104 |
| 5,066,631 A | 11/1991 | Sangokoya et al. | 502/152 |
| 5,077,255 A | 12/1991 | Welborn, Jr. | 502/104 |
| 5,082,817 A | 1/1992 | Albizzati et al. | 502/102 |
| 5,086,024 A | 2/1992 | Crapo et al. | 502/117 |
| 5,086,135 A | 2/1992 | Kissin | 526/151 |
| 5,087,788 A | 2/1992 | Wu | 585/512 |
| 5,091,352 A | 2/1992 | Kioka et al. | 502/103 |
| 5,120,696 A | 6/1992 | Tsutsui et al. | 502/113 |
| 5,122,491 A | 6/1992 | Kioka et al. | 502/117 |
| 5,126,301 A | 6/1992 | Tsutsui et al. | 502/108 |
| 5,126,303 A | 6/1992 | Resconi et al. | 502/117 |
| 5,132,262 A | 7/1992 | Rieger et al. | 502/117 |
| 5,132,381 A | 7/1992 | Winter et al. | 526/160 |
| 5,145,819 A | 9/1992 | Winter et al. | 502/117 |
| 5,147,949 A | 9/1992 | Chang | 526/129 |
| 5,157,008 A | 10/1992 | Sangokoya et al. | 502/111 |
| 5,162,578 A | 11/1992 | McCain, Jr. et al. | 502/152 |
| 5,171,799 A | 12/1992 | Kioka et al. | 26/127 |
| 5,171,871 A | 12/1992 | Miyashita | 556/27 |
| 5,171,919 A | 12/1992 | Watanabe et al. | 585/523 |
| 5,173,464 A | 12/1992 | Pettijohn et al. | 502/104 |
| 5,182,244 A | 1/1993 | Pettijohn | 502/110 |
| 5,189,000 A | 2/1993 | Masi et al. | 502/113 |
| 5,196,496 A | 3/1993 | Galimberti et al. | 526/348.6 |
| 5,198,399 A | 3/1993 | Hoff et al. | 502/111 |
| 5,206,197 A | 4/1993 | Campbell, Jr. | 502/103 |
| 5,206,199 A | 4/1993 | Kioka et al. | 502/117 |
| 5,208,304 A | 5/1993 | Waymouth | 526/164 |
| 5,216,095 A | 6/1993 | Dolle et al. | 526/127 |
| 5,223,465 A | 6/1993 | Ueki et al. | 502/117 |
| 5,225,500 A | 7/1993 | Elder et al. | 526/127 |
| 5,234,878 A | 8/1993 | Tsutsui et al. | 502/103 |
| 5,238,891 A | 8/1993 | Miro | 502/104 |
| 5,238,892 A | 8/1993 | Chang | 502/111 |
| 5,240,894 A | 8/1993 | Burkhardt et al. | 502/108 |
| 5,241,025 A | 8/1993 | Hlatky et al. | 526/129 |
| 5,258,342 A | 11/1993 | Luciani et al. | 502/107 |
| 5,260,244 A | 11/1993 | Pettijohn | 502/115 |
| 5,278,117 A | 1/1994 | Luciani et al. | 502/113 |
| 5,281,679 A | 1/1994 | Jejelowo et al. | 526/114 |
| 5,304,523 A | 4/1994 | Razavi | 502/152 |
| 5,317,036 A | 5/1994 | Brady, III et al. | 523/223 |
| 5,324,800 A | 6/1994 | Welborn, Jr. et al. | 526/160 |
| 5,329,033 A | 7/1994 | Spaleck et al. | 556/53 |
| 5,332,706 A | 7/1994 | Nowlin et al. | 502/107 |
| 5,340,786 A | 8/1994 | Tsutsui et al. | 502/117 |
| 5,347,025 A | 9/1994 | Yamada et al. | 556/11 |
| 5,348,926 A | 9/1994 | Yamada et al. | 502/117 |
| 5,350,817 A | 9/1994 | Winter et al. | 526/119 |
| 5,359,015 A | 10/1994 | Jejelowo | 526/114 |
| 5,372,682 A | 12/1994 | Devore et al. | 204/72 |
| 5,373,072 A | 12/1994 | Chang | 526/129 |
| 5,374,700 A | 12/1994 | Tsutsui et al. | 526/348.3 |
| 5,384,298 A | 1/1995 | Inahara et al. | 502/104 |
| 5,385,877 A | 1/1995 | Fujita et al. | 502/103 |
| 5,395,810 A | 3/1995 | Shamshoum et al. | 502/113 |
| 5,399,636 A | 3/1995 | Alt et al. | 526/129 |
| 5,409,874 A | 4/1995 | Imuta et al. | 502/103 |
| 5,412,131 A | 5/1995 | Sangokoya | 556/175 |
| 5,416,053 A | 5/1995 | Bai et al. | 502/128 |
| 5,416,178 A | 5/1995 | Winter et al. | 526/160 |
| 5,416,179 A | 5/1995 | Welch et al. | 526/160 |
| 5,422,325 A | 6/1995 | Jejelowo et al. | 502/104 |
| 5,434,116 A | 7/1995 | Sone et al. | 502/103 |
| 5,436,305 A | 7/1995 | Alt et al. | 526/160 |
| 5,451,649 A | 9/1995 | Zenk et al. | 526/160 |
| 5,453,475 A | 9/1995 | Rieger et al. | 526/160 |
| 5,455,316 A | 10/1995 | Tsutsui et al. | 526/114 |
| 5,455,365 A | 10/1995 | Winter et al. | 556/7 |
| 5,459,217 A | 10/1995 | Todo et al. | 526/348.1 |
| 5,466,649 A | 11/1995 | Jejelowo | 502/120 |
| 5,468,702 A | 11/1995 | Jejelowo | 502/104 |
| 5,483,002 A * | 1/1996 | Seelert et al. | 525/240 |
| 5,525,678 A | 6/1996 | Mink et al. | 525/246 |
| 5,539,076 A | 7/1996 | Nowlin et al. | 526/348.1 |
| 5,614,456 A | 3/1997 | Mink et al. | 502/115 |
| 5,616,665 A | 4/1997 | Jejelowo et al. | 526/129 |
| 6,051,525 A | 4/2000 | Lo et al. | 502/113 |
| 6,197,900 B1 | 3/2001 | Seelert et al. | 526/114 |

| | | | |
|---|---|---|---|
| 6,403,520 B1 * | 6/2002 | Hamed et al. | 502/113 |
| 6,620,888 B1 * | 9/2003 | Resconi et al. | 525/210 |
| 6,815,023 B1 * | 11/2004 | Tartarka et al. | 428/34.9 |

OTHER PUBLICATIONS

Kaminsky, Walter, "Living Polymers" on Polymerization with Extremely Productive Ziegler Catalysts, Angewandte Chemie International Edition in English 19/5 (1980), p. 390–392.

Kaminsky, Walter, "Influence of Hydrogen on the Polymerization of Ethylene with the Homogenous Ziegler System Bis(cyclopentadienyl)zirconiumdichloride/aluminoxane" Makromol. Chem. Rapid Commun. 225 (1984).

Kaminsky, Walter, "Isotactic Polymerization of Propene with (n–1,1'–ethylenedi–4,5,6,7–tetrahydroindenyl)zirconium dichloride Combined with Methylaluminoxane" Makrmol. Chem. Rapid Commun. 8, 305–310 (1987).

Dissertation of Andersen with Translation, UV spektoskopische Untersuchungen. . . als Katalysatorkompohente pp. 76–81 and 120–125.

Diplomarbeit of Kulper with Translation, "Homogene, Chlorhaltige. . .–von(CpMe5)2ZrCl2. . .von Cp2ZrCl2. . . von Ethan" section 4.0 and reference list.

Dissertation of Hahnsen with Translation, "Kinetische und mechanistische. . .und Methylaluminoxan".

Dissertation of Kulper with Translation, "Polymerisationsverhalten von loslichen. . . gegenuber I–Olefinen".

Herwig Dissertation with Translation, "Polymerisationsverhalten von loslichen. . . gegenuber loslichen, . . .Aluminiumalkylkomponente" p. 1–70, 72–101 and reference list.

Kaminsky, W., "Mettallocene Catalysts", University of Hamburg (1992).

* cited by examiner

ETHYLENE/α-OLEFIN COPOLYMER MADE WITH A NON-SINGLE-SITE/SINGLE-SITE CATALYST COMBINATION, ITS PREPARATION AND USE

This application claims the benefit of U.S. Provisional Application No. 60/334,566 filed Nov. 30, 2001, the entire disclosure of which is hereby incorporated by reference.

FIELD OF THE INVENTION

The present invention relates to an ethylene/α-olefin copolymer made with a non-single-site/single-site polymerization catalyst combination. The present invention also relates to a process for making such a copolymer and to articles made therefrom, such as, e.g., blown film.

DISCUSSION OF BACKGROUND AND OTHER INFORMATION

It is well known in the field of film production that the modulus or stiffness of a resin film increases with increasing resin density. Correspondingly, lower resin density usually results in increased impact and tear strengths. In the case of films of resins made by conventional Ziegler catalysts (which are typical examples of non-single-site polymerization catalysts) alone, improving the stiffness of a film construction, a requirement for many industrial and packaging films, entails inevitable tradeoffs, i.e., increased density to improve stiffness typically sacrifices impact and tear strengths.

Lower haze and higher gloss are other film attributes that improve with lower resin density. If both haze and gloss as well as stiffness of a film are to be optimized, another compromise has to be made with conventional Ziegler catalyzed resins. Therefore, it would be desirable to have available a resin, in particular, a polyethylene resin which despite a relatively low density and favorable film properties associated therewith such as, e.g., high impact and tear strengths (toughness) as well as low haze and high gloss, shows a modulus (stiffness) that renders the films made therefrom suitable for applications such as industrial and packaging film.

U.S. Pat. No. 6,051,525 to Lo et al., the disclosure of which is expressly incorporated herein by reference in its entirety, discloses a catalyst composition for preparing a high activity catalyst supported on silica which produces, in a single reactor, polyethylene with a broad or bimodal molecular weight distribution. The catalyst is prepared from the interaction of calcined silica with dibutylmagnesium, 1-butanol and titanium tetrachloride and a solution of methylalumoxane and ethylenebis[1-indenyl]zirconium dichloride.

U.S. Pat. No. 5,539,076 to Nowlin et al., the disclosure of which is expressly incorporated herein by reference in its entirety, discloses resins which are in situ catalytically produced polyethylene resin blends of a broad bimodal MWD that can be processed into films on existing equipment and exhibit good processability in blown film production, reduced tendency towards die-lip buildup and smoking in on-line operations. The preferred catalyst for producing these resins comprises a catalyst including a support treated with a dialkylmagnesium compound, an aluminoxane, at least one metallocene and a non-metallocene transition metal source as well as an alkylaluminum compound as cocatalyst.

U.S. Pat. No. 5,614,456 to Mink et al., the disclosure of which is expressly incorporated herein by reference in its entirety, is directed to an activated catalyst composition for producing bimodal MWD high density and linear low density polyethylene resins, which activated catalyst does not require alkylaluminum cocatalyst. A preferred catalyst comprises, as support, silica impregnated with a dialkylmagnesium compound and an organic alcohol reagent, e.g., butanol. Said support is contacted with at least two transition metal compounds, at least one of which is a metallocene, and, as activator, aluminoxane, either alone or admixed with metallocene compound.

Other background references include EP 0 286 177, EP 0 643 084, Kyung-Jun Chu et al., "Variation of molecular weight distribution (MWD) and short chain branching distribution (SCBD) of ethylene/1-hexene copolymers produced with different in-situ supported metallocene catalysts," Macromol. Chem. Phys. 201 (2000), 340–348, and literature cited therein, C. Gabriel et al., "Comparison of different methods for the investigation of the short-chain branching distribution of LLDPE," Polymer 42 (2001) 297–303, and literature cited therein, and J. D. Kim et al., "Copolymerization of Ethylene and 1-Hexene with Supported Metallocene Catalysts: Effect of Support Treatment, Macromol. Rapid Commun. 20 (1999), 347–350, and the literature cited therein.

SUMMARY OF THE INVENTION

The present invention provides an ethylene/α-olefin copolymer which when formed into products such as film not only shows properties attributable to its relatively low density, in particular, high impact strength, high tear resistance and high clarity, but also provides a degree of stiffness which usually can only be found in products made from resin of significantly higher density.

The present invention provides an ethylene/α-olefin copolymer comprising a first component produced by a catalyst derived from a non-single-site polymerization catalyst and a second component produced by a single-site polymerization catalyst. The weight ratio of the first component and the second component ranges from about 9:1 to about 1:9 and the copolymer has an α-olefin content of about 5 to about 20 percent by weight. Furthermore, the copolymer shows at least two CRYSTAF peak temperatures which differ by at least about 15° C., preferably by at least about 20° C., more preferably by at least about 25° C., e.g., at least about 30° C. Additionally or alternatively, the copolymer shows at least two DSC melting peak temperatures which differ by at least about 15° C., preferably by at least about 20° C.

Preferably, the copolymer shows at least one DSC melting peak temperature in the range from about 115° C. to about 135° C. and/or at least one CRYSTAF peak in the temperature range from about 75° C. to about 95° C.

In another aspect, the weight ratio of the first component and the second component ranges from about 8:2 to about 2:8, for example, from about 7:3 to about 3:7.

In yet another aspect, the copolymer has an α-olefin content of at least about 7 weight percent, for example, at least about 10 weight percent or at least about 15 weight percent.

In still another aspect, the α-olefin comprises 3 to about 12 carbon atoms and may, for example be selected from one or more of propene, 1-butene, 1-pentene, 4-methyl-1-pentene, 1-hexene, 1-heptene, 1-octene and 1-decene. A preferred α-olefin is 1-hexene.

In another aspect, the copolymer has a density of not more than about 0.93 g/cm$^3$, for example, not more than about 0.925 g/cm$^3$, or even not more than about 0.92 g/cm$^3$.

In another aspect, the copolymer has an essentially unimodal molecular weight distribution.

In yet another aspect, the copolymer has been produced in a single reactor.

In still another aspect, the non-single-site polymerization catalyst is derived from at least one compound selected from Ti and V compounds.

In another aspect, the single-site polymerization catalyst is derived from at least one metallocene transition metal compound which may for example be selected from Ti, Zr and Hf compounds, preferably, a metallocene transition metal compound of the general formula (II)

$$Cp_xMA_y$$ (II)

wherein x is at least 2, M is selected from zirconium and hafnium, Cp is selected from optionally substituted cyclopentadienyl and optionally substituted cyclopentadienyl that is part of an aromatic polycyclic ring system, provided that at least one Cp is cyclopentadienyl that is part of an aromatic polycyclic ring system, two cyclopentadienyl moieties may be linked by a bridging group, A is selected from halogen, hydrogen, hydrocarbyl and combinations thereof, and the sum (x+y) is equal to the valence of M.

In preferred compounds of formula (II), M represents zirconium and/or the aromatic polycyclic ring system is selected from optionally substituted indenyl and optionally substituted fluorenyl and/or x is 2 and the Cp groups are linked by a bridging group, e.g., a bridging group including at least one silicon atom. Preferred embodiments of the metallocene transition metal compound of formula (II) include ethylenebis(indenyl)-zirconium dichloride and dimethylsilyl (cyclopentadienyl)(fluorenyl)zirconium dichloride.

In another aspect, the metallocene transition metal compound may be used in combination with an alumoxane.

The present invention also provides an ethylene/1-hexene copolymer comprising a first component produced by a non-single-site polymerization catalyst derived from a titanium compound and a second component produced by a single-site polymerization catalyst derived from a zirconium metallocene compound. The copolymer has a 1-hexene content of about 6 to about 12 percent by weight and the weight ratio of the first component and the second component ranges from about 7:3 to about 3:7. Furthermore, it shows at least two CRYSTAF peak temperatures which differ by at least about 20° C. and at least two DSC peak temperatures which differ by at least about 20° C. The density of the copolymer is not higher than about 0.925 g/cm³, and the zirconium metallocene compound comprises two bridged cyclopentadienyl rings, at least one of said cyclopentadienyl rings being part of an indenyl or fluorenyl moiety. Also, the copolymer is produced in a single reactor.

The present invention furthermore provides a process for making the above copolymers. This process comprises contacting, in a single reactor, ethylene and α-olefin under polymerization conditions and in the presence of hydrogen with a catalyst combination comprising at least one non-single-site polymerization catalyst and at least one single-site polymerization catalyst.

In one aspect, the single-site polymerization catalyst is derived from at least one metallocene transition metal compound.

In another aspect, the catalyst combination is used together with an alkylaluminum cocatalyst.

In yet another aspect, the catalyst combination comprises a support such as, e.g., silica.

Furthermore, the process may be carried out continuously. Preferably, it is carried out in the gas phase or as slurry polymerization.

The present invention also provides an article made from the above copolymer, for example a blown or extruded article such as a film, including a multilayer film having a thickness of, for example, about 0.2 to about 10 mils. Also, the copolymer may contain up to 20 ppm transition metal derived from the deactivated catalyst.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how the several forms of the present invention may be embodied in practice.

All percent measurements in this application, unless otherwise stated, are measured by weight based upon 100% of a given sample weight. Thus, for example, 30% represents 30 weight parts out of every 100 weight parts of the sample.

Also, unless otherwise stated, a reference to a compound or component (e.g., the metallocene compounds used in the process of the present invention) includes the compound or component by itself, any of its individual stereoisomers (e.g., rac and meso) and any mixtures thereof, as well as any combination with other compounds or components, such as mixtures of compounds.

Further, when an amount, concentration, or other value or parameter, is given as a list of upper preferable values and lower preferable values, this is to be understood as specifically disclosing all ranges formed from any pair of an upper preferred value and a lower preferred value, regardless whether ranges are separately disclosed. Moreover, the upper and lower values of any two or more ranges given for a specific parameter are to be understood as also disclosing the ranges formed by combining the lower value of a first range with the upper value of a second range and vice versa.

The term "non-single-site polymerization catalyst" is to denote a polymerization catalyst which comprises more than one catalytically active site. Typical examples of such non-single-site polymerization catalysts are the conventional Ziegler catalysts, for example those derived from Ti and V compounds.

The term "single-site polymerization catalyst", on the other hand is to denote a polymerization catalyst which comprises essentially only one catalytically active site. Typical examples of such catalysts are catalysts based on transition metal metallocene compounds, in particular those of Ti, Zr and Hf. However, there are many other single-site polymerization catalysts which may be employed according to the present invention and are well known to those of skill in the art. Illustrative, non-limiting examples thereof can be found in the literature, see, e.g., G. J. P. Britovsek et al., "The Search for New-Generation Olefin Polymerization Catalysts: Life beyond Metallocenes", Agnew. Chem. Int. Ed. 38 (1999), 428–447, and literature cited therein, G. G. Hlatky, "Heterogeneous Single-Site Catalysts for Olefin Polymerization", Chem. Rev. 100 (2000), 1347–1376, and literature cited therein, as well as S. D. Ittel et al., "Late- Metal Catalysts for Ethylene Homo- and Copolymerization", Chem. Rev. 100 (2000), 1169–1203, and literature cited therein. All of these publications are fully incorporated herein by reference. Additional examples of single-site polymerization catalysts are based on boracenes, salicylamidine metal complexes, organo-chromium compounds etc. See also the patent literature, for example, U.S. Pat. Nos. 6,294,626; 6,291,386; 6,265,504; 6,255,415; 6,239,062; 6,232,260; 6,228,959; 6,204,216, 6,180,552; and 6,114,270, all fully incorporated herein by reference. Further examples of single-site polymerization catalysts suitable for use in the present invention will be apparent to those skilled in the art.

Transition metal metallocene-based catalysts are a preferred class of single-site polymerization catalysts for use in the present invention. Therefore, for the sake of convenience the following description will exclusively refer to this preferred class of single-site polymerization catalysts. It must be kept in mind, however, that these metallocene-based catalysts may be replaced by any of the other single-site polymerization catalysts known in the art.

A preferred synthesis of a catalyst combination useful for the preparation of the ethylene/α-olefin copolymer of the present invention comprises two stages, synthesis of a supported catalyst intermediate (preferably in the given order of consecutive steps and without isolation of a dry product until after the incorporation of the transition metal compound for forming the non-single-site polymerization catalyst) and synthesis of the final supported catalyst combination. Thus the synthesis is preferably carried out in a series of several consecutive steps under inert conditions in the substantial absence of water and molecular oxygen.

According to said preferred synthesis, support material is first slurried in a non-polar solvent. Support materials for preparing the catalyst combinations for use in the present invention comprise solid, particulate, porous materials and may include support materials disclosed in U.S. Pat. No. 4,173,547, the disclosure of which is expressly incorporated herein by reference in its entirety. Such support materials include, but are not limited to, metal oxides, hydroxides, halides or other metal salts, such as sulfates, carbonates, phosphates, silicates, and combinations thereof, and may be amorphous and crystalline. Some preferred support materials include silica, alumina and combinations thereof. Support material particles may have any shape, and are preferably approximately spherical (such as obtainable, e.g., by spray-drying).

Preferred support materials comprise particles, the optimum size of which can easily be established by one of ordinary skill in the art having the benefit of the present disclosure. A support material that is too coarse may lead to unfavorable results, such as low bulk density of the resulting polymer powder. Thus, preferred support materials comprise particles with average size, e.g., diameter, smaller than about 250 µm, more preferably smaller than about 200 µm, most preferably smaller than about 80 µm. Preferred support materials comprise particles larger than about 0.1 µm, more preferably larger than about 10 µm in size, because smaller silica particles may produce small polymer particles (fines) which may cause reactor instability.

Support material is preferably porous, as porosity increases the surface area of the support material, which, in turn, provides more sites for reaction. The specific surface areas may be measured in accordance with British Standards BS 4359, volume 1(1969), fully incorporated herein by reference in its entirety. The specific surface area of support material used for the purposes of the present invention is preferably at least about 3 $m^2/g$, more preferably at least about 50 $m^2/g$, and most preferably at least about 150 $m^2/g$, e.g., about 300 $m^2/g$. The specific surface area of support material is generally less than about 1500 $m^2/g$.

The internal porosity of support material may be measured as the ratio between the pore volume and the weight of the material and can be determined by the BET technique, such as described by Brunauer et al., J. Am. Chem. Soc., 60, pp. 209–319 (1938), fully incorporated herein by reference in its entirety. The internal porosity of support material is preferably larger than about 0.2 $cm^3/g$, more preferably larger than about 0.6 $cm^3/g$. As a practical matter, the support material internal porosity is limited by particle size and internal pore diameter. Thus, internal porosity generally is less than about 2.0 $cm^3/g$.

Preferred support materials for use in the present invention comprise silica, particularly amorphous silica, and most preferably high surface area amorphous silica. Such support materials are commercially available from a number of sources, and include a material marketed under the tradenames of Davison 952 or Davison 955 by the Davison Chemical Division of W. R. Grace and Company or Crosfield ES70 by Crosfield Limited (surface area=300 $m^2/g$; pore volume 1.65 $cm^3/g$). The silica is in the form of spherical particles, which are obtained by a spray-drying process. As procured, theses silicas are not calcined (dehydrated).

Because the catalyst starting materials used in the preparation of the catalyst combinations for use in the present invention may react with water, the support material should preferably be substantially dry. Water that is physically bound to the support material, therefore, is preferably removed, such as by calcination, prior to forming a non-single-site/single-site catalyst combination for use in the present invention.

Preferred calcined support materials comprise support material that has been calcined at a temperature higher than about 100° C., more preferably higher than about 150° C., even more preferably higher than about 200° C., e.g., higher than about 250° C. As sintering of the support material is preferably avoided, calcination is preferably effected at a temperature that is below the sintering temperature of the support material. In one embodiment, calcination of a support material, e.g., silica, is carried out at a temperature of not higher than about 950° C. In another embodiment, calcination of a support material is carried out at a temperature of not higher than about 850° C. In yet another embodiment, calcination of a support material is carried out at a temperature of not higher than about 650° C. Total calcination times usually are not shorter than about 4 hours, preferably not shorter than about 6 hours, whereas calcination times longer than 24 hours usually offer no particular advantage.

Calcination of support material can be performed using any procedure known to those of ordinary skill in the art. A preferred method of calcination is disclosed by T. E. Nowlin et al., AZiegler-Natta Catalysts on Silica for Ethylene Polymerization,@ J. Polym. Sci., Part A: Polymer Chemistry, Vol. 29, 1167–1173 (1991), the disclosure of which is expressly incorporated herein by reference in its entirety.

As used in this disclosure, support material as used in the Examples below may, for example, be prepared as follows. In a fluidized-bed, silica (e.g., Davison 955), is heated in steps from ambient temperature to the desired calcining temperature (i.e., 600° C.). The silica is maintained at about this temperature for about 4 to about 16 hours, whereafter it is allowed to cool to ambient temperature. The calcination temperature primarily affects the number of OH groups on the support surface, i.e., the number of OH groups on the support surface (silanol groups in the case of silica) is approximately inversely proportional to the temperature of drying or dehydration: the higher the temperature the lower the hydroxyl group content. In other words, at each calcination temperature the support (e.g., silica) reaches a certain OH concentration, after which additional heating has no further effect on the OH concentration.

A slurry of the support material in a non-polar solvent may be prepared by introducing the support material into the solvent, preferably while stirring, and heating the mixture to about 25 to about 70° C., preferably to about 40 to about 60° C. The most suitable non-polar solvents are materials which are liquid at reaction temperatures and in which all of the reactants used later during the catalyst preparation, e.g., organomagnesium compounds, oxygen-containing compounds and the like and transition metal compounds, are at least partially soluble. Preferred non-polar solvents are alkanes, particularly those containing about 5 to about 10 carbon atoms such as isopentane, hexane, isohexane, n-heptane, isoheptane, octane, nonane, and decane. However, other materials including cycloalkanes and aromatic solvents, particularly those containing about 6 to about 12 carbon atoms such as benzene, toluene, ethylbenzene and the xylenes, may also be used. Of course, it is also possible to use solvent mixtures.

Prior to use, the non-polar solvent should be purified, such as by percolation through silica gel and/or molecular sieves, to remove traces of water, molecular oxygen, polar compounds, and other materials capable of adversely affecting catalyst activity. It is to be noted that the temperature of the slurry before addition of the transition metal compound for the non-single-site catalyst should not be in excess of 90° C., since otherwise a deactivation of the transition metal component is likely to result. Accordingly, all catalyst synthesis steps are preferably carried out at a temperature below 90° C., even more preferred below 80° C.

Following the preparation of a slurry of the support material in a non-polar solvent, the slurry is preferably contacted with an organomagnesium compound. Preferred organomagnesium compounds for use in the present invention include dialkylmagnesium compounds of the general formula (I):

$$R^1{}_m MgR^2{}_n \quad (I)$$

wherein $R^1$ and $R^2$ are the same or different branched or unbranched alkyl groups containing about 2 to about 12 carbon atoms, preferably about 4 to about 10 carbon atoms, and even more preferred about 4 to about 8 carbon atoms and m and n are each 0, 1 or 2, provided that the sum (m+n) is equal to the valence of Mg. The most preferred dialkylmagnesium compound is dibutylmagnesium. Of course, it is also possible to use more than one organomagnesium compound, e.g., two different organomagnesium compounds.

The purpose of the organomagnesium compound is to increase the activity of the catalyst. For a better understanding of the role of the organomagnesium compound for the performance of polymerization catalysts such as those disclosed herein reference may be made to the above-mentioned article by T. E. Nowlin et al. in J. Polym. Sci.: Part A: Polymer Chemistry, Vol. 29, 1167–1173 (1991). The amount of organomagnesium compound will generally be greater than about 0.3 mmol/g, more preferably greater than about 0.5 mmol/g, even more preferably greater than 0.7 mmol/g, where the amount of organomagnesium compound is given as mmol Mg/g of support material. In the synthesis of the catalyst composition for use in the present invention it is desirable to add not more organo-magnesium compound than will be deposited—physically or chemically—into the support since any excess of the organomagnesium compound in the liquid phase may react with other chemicals used for the catalyst synthesis and precipitate them outside of the support. The drying temperature of the support materials affects the number of sites on the support available for the dialkylmagnesium compound: the higher the drying temperature the lower the number of sites. Thus, the exact ratio of organomagnesium compound to support will vary and should be determined on a case-by-case basis to assure that preferably only so much of the organomagnesium compound is added to the slurry as will be deposited into the support without leaving excess organomagnesium compound in the liquid phase. Thus the ratios given below are intended only as an approximate guideline and the exact amount of organomagnesium compound is to be controlled by the functional limitation discussed above, i.e., it should preferably not be greater than that which can completely be deposited into the support. The appropriate amount of the organomagnesium compound can be determined in any conventional manner, e.g., by adding the organomagnesium compound to the slurry of the support material until free organomagnesium compound is detected in the liquid phase (e.g., by taking a sample of the liquid phase and analyzing it for Mg by one of several analytical procedures known to one of ordinary skill in the art). If organo-magnesium compound is added in excess of the amount deposited into the support material, it can be removed, e.g., by filtration and washing of the support material. However, this is less desirable than the embodiment described above.

For example, for the silica support heated at about 600° C., the amount of the organomagnesium compound added to the slurry will generally be less than about 1.7 mmol/g, preferably less than about 1.4 mmol/g, even more preferably less than about 1.1 mmol/g.

The treatment of the support material with the organomagnesium compound can on principle be carried out at any temperature at which the organomagnesium compound is stable. The contacting of the slurry of the support material in a non-polar solvent with the organomagnesium compound will generally be carried out at a temperature between room temperature (e.g., 20° C.) and 80° C. Preferably, the addition is carried out at slightly elevated temperature, e.g., at a temperature of at least about 30° C., even more preferred at least about 40° C. After the addition of the organomagnesium compound is complete, the slurry will usually be stirred, preferably at about the temperature of addition, for a sufficient time to allow the organomagnesium compound to react and/or interact with the support material substantially completely. Generally this time will be not less than about 0.1 hours, preferably not less than about 0.5 hours, although stirring for more than about 2.0 hours will not bring about any significant further reaction/interaction.

Next, the support treated with the organomagnesium compound preferably is contacted with an oxygen-containing organic compound preferably containing 1 to about 6 carbon atoms such as, e.g., an aliphatic or aromatic alcohol, an aldehyde, a ketone, an ester, a carbonyl chloride, a carboxylic acid and the like. Preferred, non-limiting examples of oxygen-containing compounds are monohydric alcohols having 1 to about 6 carbon atoms such as, e.g., methanol, ethanol, n-propanol and isopropanol, n-butanol, n-pentanol and n-hexanol. n-Butanol is particularly preferred.

The amount of oxygen-containing compound employed is preferably such that it will react substantially completely with the organomagnesium/support intermediate material formed after the addition of the organomagnesium compound to the slurried support material. Generally the molar ratio of organomagnesium compound (e.g., dialkylmagnesium compound) to oxygen-containing compound will be at least about 1:5, more preferably at least about 1:2, and most preferred at least about 1:1. On the other hand, it is preferred that said ratio is not higher than about 15:1, particularly not higher than about 10:1, with a ratio of not higher than about 6:1, e.g., not higher than 2:1, being even more preferred.

Regarding the temperature at which the oxygen-containing compound is added to the slurry of support material treated with the organomagnesium compound, there are no particular restrictions besides the thermal stability of the materials involved. Generally, the addition will be carried out at a temperature between room temperature and the boiling point of the non-polar solvent of the slurry. As a matter of convenience the temperature will preferably be about the same as that at which the organomagnesium compound was added and at which the slurry of organomagnesium compound-treated support material was stirred before the addition of the oxygen-containing compound, respectively. Following the addition of the oxygen-containing compound, the slurry will generally be stirred, preferably at about the temperature of addition, for a time period that is sufficient to allow the oxygen-containing compound to substantially completely react/interact with the organomagnesium compound-treated support material. Said stirring time is generally at least about 0.5 hours, preferably at least about 1.0 hour, although stirring for more than about 2.0 hours usually does not bring about any significant further reaction/interaction.

After the reaction/interaction with the oxygen-containing compound as described above, the resulting slurry of support material is contacted with one or more (preferably one) transition metal compound for forming a non-single-site polymerization catalyst. During this step, the slurry temperature is preferably maintained at about 25° C. to about 70° C., particularly at about 40° C. to about 60° C. As noted above, temperatures in the slurry of about 90° C. or greater are likely to result in deactivation of the transition metal source. Suitable transition metal compounds for the non-single-site polymerization catalyst include those of elements of Groups IV and V of the Periodic Table, particularly titanium-containing and vanadium-containing compounds. Illustrative, non-limiting examples of such compounds are titanium and vanadium halides, e.g., titanium tetrachloride, vanadium tetrachloride, vanadium oxytrichloride, titanium and vanadium alkoxides, wherein the alkoxide moiety has a branched or unbranched alkyl radical of 1 to about 20 carbon atoms, preferably 1 to about 10 carbon atoms, and even more preferably 1 to about 6 carbon atoms (e.g., methoxy, ethoxy, propoxy and isopropoxy). The preferred transition metal compounds are titanium-containing compounds, particularly tetravalent titanium-containing compounds. The most preferred titanium compound is $TiCl_4$.

The amount of transition metal compound(s) for forming the non-single-site polymerization catalyst is at least in part determined by the desired ratio of first polymer component to second polymer component in the desired ethylene/α-olefin copolymer according to the present invention. In other words, because the non-single-site polymerization catalyst will produce the first polymer component and the single-site polymerization catalyst will produce the second polymer component, under otherwise identical polymerization conditions the ratio of first polymer component to second polymer component in the resulting copolymer will increase with increasing molar ratio of transition metal compound(s) for forming the non-single-site polymerization catalyst to compound(s) for forming the single-site polymerization catalyst of the catalyst combination for use in the present invention. The total amount of catalyst components, on the other hand, is limited by the capability of the specific support material employed to accommodate the catalyst components. Generally, however, the transition metal compound for the non-single-site catalyst is employed in an amount that results in an atomic ratio of Mg of the organomagnesium compound (e.g., dialkylmagnesium compound employed to treat the support) to transition metal(s) for the non-single-site catalyst of at least about 0.5:1, more preferably at least about 1:1, and most preferred at least about 1.7:1. On the other hand it is preferred that said ratio is not higher than about 5:1, particularly not higher than about 3:1, a ratio of not higher than about 2:1 being particularly preferred.

Mixtures of non-single-site polymerization catalyst transition metal compounds may also be used and generally, no particular restrictions are imposed on the transition metal compounds which may be included. Any transition metal compound that may be used alone may also be used in conjunction with other suitable transition metal compounds.

After the addition of the transition metal compound(s) for the non-single-site catalyst is complete, in one embodiment of the catalyst synthesis, the slurry solvent is removed, e.g., by evaporation and/or filtration, to obtain a preferably free-flowing powder of a catalyst intermediate.

Next, incorporation of the metallocene compound(s) (or any other suitable compound(s)) for forming the single-site polymerization catalyst can be undertaken. A metallocene compound usually is activated with an aluminoxane which preferably is contacted with the support material together with the metallocene compound.

Preferred metallocene compounds for use in the present invention have the general formula (II)

$$Cp_xMA_y \qquad (II)$$

wherein x is at least 2, M is titanium, zirconium or hafnium, Cp represents optionally substituted cyclopentadienyl and optionally substituted cyclopentadienyl that is part of an aromatic polycyclic ring system, provided that at least one Cp is cyclopentadienyl that is part of an aromatic polycyclic ring system, two cyclopentadienyl moieties may be linked by a bridging group, A is selected from halogen, hydrogen, hydrocarbyl (preferably having 1 to about 12 carbon atoms) and combinations thereof, and the sum (x+y) is equal to the valence of M.

In the above formula (II), the preferred transition metal atom M is zirconium or hafnium, most preferably zirconium. The substituents on the cyclopentadienyl group or polycyclic ring system, if any, will usually be (preferably straight-chain) alkyl groups having 1 to about 6 carbon atoms, such as, e.g., methyl, ethyl, propyl, n-butyl, n-pentyl and n-hexyl. At least one of the cyclopentadienyl moieties is part of an (optionally substituted) polycyclic, e.g., bicyclic or tricyclic, aromatic ring system such as, e.g., indenyl and fluorenyl. At least two of the cyclopentadienyl moieties may be (and preferably are) bridged, for example, by polymethylene or dialkylsilyl groups, such as  —$CH_2$—, —$CH_2$—$CH_2$—, —CR=R@- and —CR=R@-CR=R@- where R= and R@ are lower (e.g., $C_1$–$C_4$) alkyl groups or hydrogen atoms, —Si(CH$_3$)$_2$—, —Si(CH$_3$)$_2$—CH$_2$—CH$_2$—Si(CH$_3$)$_2$— and similar bridging groups. If A in the above formula represents halogen it represents F, Cl, Br and/or I and is preferably chlorine. If A represents a hydrocarbyl group, it preferably is an alkyl or aryl group. The alkyl group preferably is a straight-chain or branched alkyl group containing 1 to about 8 carbon atoms, such as methyl, ethyl, propyl, isopropyl, n-butyl, isobutyl, n-pentyl, n-hexyl and n-octyl.

Of course, as long as the above proviso is satisfied, the Cp moieties in the above general formula may be the same or different. The same applies if y is equal to or greater than 2 with respect to the groups A which may also be the same or different in that case.

Illustrative, non-limiting examples of metallocene compounds suitable for making the single-site catalyst for use in the present invention include bis(cyclopentadienyl)metal dihalides, bis(cyclopentadienyl)metal hydridohalides, bis (cyclopentadienyl)metal monoalkyl monohalides and bis (cyclopentadienyl)metal dialkyls wherein the metal is preferably zirconium or hafnium, the halide groups are preferably chlorine, the alkyl groups (including cycloalkyl groups) preferably have 1 to about 6 carbon atoms and at least one of the cyclopentadienyl moieties is fused with a benzene ring to afford, e.g., an indenyl or fluorenyl ring system. Preferably, the cyclopentadienyl moieties are connected by a bridging group. Illustrative, non-limiting examples of corresponding metallocenes include ethylenebis(indenyl)zirconium dichloride, ethylenebis (indenyl)-zirconium dibromide, ethylenebis(indenyl) dimethylzirconium, ethylenebis(indenyl)-diphenylzirconium, ethylene-bis(indenyl)methylzirconium chloride, isopropylidene ethylene(cyclopentadienyl)-(fluorenyl)zirconium dichloride, isopropylidene (cyclopentadienyl)(methylcyclopentadienyl)-zirconium dichloride, dimethylsilylbis(indenyl)zirconium dichloride, dimethylsilyl(cyclo-pentadienyl)(fluorenyl)zirconium dichloride, diphenylsilylbis(indenyl)zirconium dichloride and methylphenylsilylbis(indenyl)zirconium dichloride, as well as derivatives of these metallocenes wherein the cyclopentadienyl-containing moieties have up to three methyl substituents. Of these, ethylenebis(indenyl) zirconium dichloride and dimethylsilyl(cyclopentadienyl) (fluorenyl)zirconium dichloride are preferred metallocene compounds for use in the present invention.

Of course, mixtures of compounds for forming the single-site polymerization catalyst such as mixtures of metallocene compounds may also be used. Any compound that may be used alone may also be used in conjunction with other suitable compounds. Moreover, the amount of metallocene or any other single-site polymerization catalyst compound(s) is such that it results in the desired ratio of first component to second component in the copolymer, which ratio in turn is at least in part determined by the atomic ratio of metal(s) of the non-single-site polymerization catalyst transition metal compound(s) to metal(s) of the single-site polymerization catalyst compound(s). Generally said atomic ratio is at least about 1:1, more preferably at least about 2:1 or at least about 3:1, and most preferred at least about 4:1. On the other hand, said ratio is generally not higher than about 30:1, preferably not higher than about 15:1, with a ratio of not higher than about 10:1 being particularly preferred.

Incorporation of a metallocene compound into the carrier can be accomplished in various ways, usually together with an aluminoxane. Incorporation of either or both the alumi-noxane and the metallocene compound can be into a slurry of catalyst intermediate in a non-polar solvent. The aluminoxane and metallocene compound can be added in any order, or together (e.g., as solution in an aromatic or the same non-polar solvent), to that slurry or to the isolated catalyst intermediate. A preferred way of combining aluminoxane and metallocene is to add a solution of these two components in an aromatic solvent (preferably toluene) to a slurry of the catalyst intermediate in a different non-polar solvent. This is preferably done at room temperature, but higher temperatures can also be used as long as the stability of the various materials present is not affected thereby. Following the addition, the resulting mixture is usually stirred (preferably at room temperature) for sufficient time to allow all of the components to react and/or interact substantially completely with each other. Generally the resulting mixture is stirred for at least about 0.5 hours, preferably at least about 1.0 hours, while stirring times in excess of about 10 hours usually do not offer any particular advantage. Thereafter the liquid phase can be evaporated from the slurry to isolate a free-flowing powder containing both non-single-site polymerization catalyst compound and metallocene single-site polymerization catalyst compound. Filtering is usually avoided to substantially eliminate the loss of catalytic components. If evaporation of the liquid phase under atmospheric pressure would require temperatures that might adversely affect the catalyst components (degradation) reduced pressure may be used As mentioned above, preferably the intermediate comprising the non-single-site polymerization catalyst transition metal is first recovered from the slurry in the initially employed non-polar solvent or solvent mixture (e.g., by filtration and/or distilling the solvent) and is then reslurried in the same or a different non-polar solvent. Non-limiting examples of suitable non-polar solvents for the above purpose (i.e., reslurrying of intermediate) include, but are not limited to, aliphatic, cycloaliphatic and aromatic hydrocarbons such as those set forth above for use in the preparation of the initial slurry of the support material in a non-polar solvent, e.g., n-pentane, isopentane, n-hexane, methylcyclopentane, isohexanes, cyclohexane, n-heptane, methylcyclohexane, isoheptanes, benzene, toluene, ethylbenzene, xylenes and mixtures of two or more thereof.

The aluminoxanes preferably employed in combination with metallocene transition metal compounds are not particularly limited. They include oligomeric linear and/or cyclic alkylaluminoxanes of the general formula R—(Al (R)—O)$_n$—AlR$_2$ for oligomeric, linear aluminoxanes and (—Al(R)—O—)$_m$ for oligomeric cyclic aluminoxanes wherein n is 1–40, preferably 10–20, m is 3–40, preferably 3–20, and R is a $C_1$–$C_8$ group, and preferably methyl to provide methylaluminoxane (MAO). MAO is a mixture of oligomers with a very wide distribution of molecular weights and usually with an average molecular weight of about 1200. MAO is typically kept in solution in toluene. It is also possible to use, for the present purpose, aluminoxanes of the type just described wherein the alkyl groups in the above general formulae are different. A preferred example thereof is modified methylaluminoxane (MMAO) wherein in comparison to MAO a part of the methyl groups is replaced by other alkyl groups. Modified methylaluminoxanes are disclosed, e.g., in U.S. Pat. No. 6,001,766, the disclosure of which is expressly incorporated by reference herein in its entirety.

The aluminoxane or mixture of aluminoxanes usually is employed in an amount which results in sufficient activation of the metallocene transition metal compound-derived catalyst component of the catalyst combination for use in the present invention. Because the metallocene transition metal compound-derived catalyst produces the second component of the copolymer to be made therewith, under otherwise identical polymerization conditions the weight fraction of second polymer component usually increases with increasing amount of aluminoxane employed. Generally, the atomic ratio of Al in the aluminoxane to metal in the metallocene compound(s) is at least about 10:1, more preferably at least about 50:1, and most preferred at least about 80:1. On the other hand said ratio is generally not higher than about 1,000:1, particularly not higher than about 500:1, with a ratio of not higher than about 300:1 being particularly preferred.

An alternative way of incorporation of the aluminoxane or the activated metallocene compound-derived catalyst (metallocene-aluminoxane) onto the support is by stripping the intermediate of the solvent to form a free-flowing powder. This free-flowing powder can then be impregnated by determining the pore volume of the intermediate material and providing an aluminoxane (or metallocene-aluminoxane) solution in a volume equal to or less than two times the total pore volume of the intermediate material, whereafter the dry non-single-site/metallocene catalyst combination is recovered. A more detailed description of said impregnation (incorporation) procedure can be found in, e.g., U.S. Pat. No. 5,614,456, the disclosure whereof is incorporated herein by reference in its entirety.

Generally, it is preferred to use the catalyst combination for use in the present invention in combination with a cocatalyst (that primarily activates the non-single-site polymerization catalyst). Suitable cocatalysts are organometallic compounds of Group IA, IB, IIA, IIB, IIIA or IIIB elements, such as, e.g., aluminum, sodium, lithium, zinc, boron and magnesium, and in general any one or a combination of any of the materials commonly employed to activate Ziegler-Natta olefin polymerization catalyst components. Examples thereof are alkyls, hydrides, alkylhydrides and alkylhalides of the mentioned elements, such as n-butyllithium, diethylzinc, di-n-propylzinc and triethylboron. Usually, however, the cocatalyst will be an alkylaluminum compound, preferably a compound of the general formula (III):

$$R^5_a AlX_b \quad (III)$$

wherein a is 1, 2 or 3, $R^5$ is a linear or branched alkyl group containing 1 to about 10 carbon atoms, X represents hydrogen atom or halogen atom and b is 0, 1 or 2, provided that the sum (a+b) is 3.

Preferred types of compounds of the general formula (III) above are trialkylaluminum, dialkylaluminum hydride, dialkylaluminum halide, alkylaluminum dihydride and alkylaluminum dihalide. The halide preferably is Cl and/or Br. Preferred alkyl groups are linear or branched and contain 1 to about 6 carbon atoms, such as methyl, ethyl, propyl, isopropyl, butyl, isobutyl, straight-chain and branched pentyl and hexyl groups. Specific examples of suitable cocatalysts are trimethylaluminum, triethylaluminum, tripropylaluminum, triisopropylaluminum, tributylaluminum, triisobutylaluminum, trihexylaluminum, trioctylaluminum, diisobutylhexylaluminum, isobutyldihexylaluminum, diisobutylaluminum hydride, dihexylaluminum hydride, diethylaluminum chloride, and diisobutylaluminum chloride. A preferred cocatalyst is trimethylaluminum (TMA). Other alkylaluminum compounds, for example those wherein X in the above formula (III) is alkoxy (e.g. having 1 to 6 carbon atoms) may also be employed.

The amount of cocatalyst is sufficient to (further) activate the non-single-site polymerization catalyst of the catalyst combination for use in the present invention. A suitable amount can be determined by one of ordinary skill in the art. If too little cocatalyst is used, the catalyst may not be completely activated, leading to wasted non-single-site polymerization catalyst transition metal compound and also failing to provide the target ratio of first polymer component to second polymer component in the ethylene copolymer to be produced. Too much cocatalyst, on the other hand, results in wasted cocatalyst, and may even give rise to unacceptable impurity of the copolymer produced. Generally, however the amount of cocatalyst employed is based on the amount of ethylene fed to the polymerization process. The amount of cocatalyst generally is at least about 5 ppm, more preferably at least about 20 ppm, and most preferred at least about 40 ppm. On the other hand, the amount of cocatalyst generally is not higher than about 500 ppm, preferably not higher than about 400 ppm and particularly not higher than about 300 ppm (based on the ethylene employed).

Polymerization

A catalyst combination prepared as described above may be used to polymerize ethylene in conjunction with one or more α-olefins to provide the copolymers according to the present invention. Illustrative, non-limiting examples of α-olefins that may be used are those having 3 to about 10 carbon atoms, e.g., propylene, 1-butene, 1-pentene, 1-hexene, 4-methyl-1-pentene, 1-heptene and 1-octene, preferably 1-butene, 1-pentene, 1-hexene or 4-methyl-1-pentene and, most preferably, 1-hexene. The polymerization may be carried out using any suitable, conventional olefin polymerization process, such as slurry, solution or gas phase polymerization, but preferably it is carried out in a slurry reactor or in a gas phase reactor, particularly a fluidized-bed reactor. The polymerization can be carried out batchwise, semicontinuously or continuously. Preferably, the reaction is conducted in the substantial absence of catalyst poisons, such as moisture, carbon monoxide and acetylene, with a catalytically effective amount of the catalyst combination at temperature and pressure conditions sufficient to initiate the polymerization reaction. Particularly desirable methods for producing the copolymers of the present invention are in a slurry or fluidized bed reactor. Such reactors and means for operating it are described by, e.g., U.S. Pat. Nos. 4,001,382, 4,302,566, and 4,481,301, the entire contents of which are expressly incorporated herein by reference. The polymer produced in such reactors contains (deactivated) catalyst particles because the catalyst is not separated from the polymer.

The molecular weight of the copolymer as a whole may suitably be controlled in a manner well known to those skilled in the art, e.g., by adding small amounts of water to the polymerization reactor. Moreover, hydrogen may be added as chain transfer agent. The amount of hydrogen will generally be between about 0 to about 2.0 moles of hydrogen per mole of ethylene employed.

Polymerization temperature and time can be determined by one of ordinary skill in the art based on a number of factors, such as, the type of polymerization process to be used. As chemical reactions generally proceed at a greater rate with higher temperature, polymerization temperature should be high enough to obtain an acceptable polymerization rate. In general, therefore, polymerization temperatures are higher than about 30° C., more often higher than about 75° C. On the other hand, polymerization temperature should not be so high as to cause deterioration of, e.g., catalyst or copolymer. Specifically, with respect to a fluidized-bed process, the reaction temperature is preferably not so high as to lead to sintering of copolymer particles. In general, polymerization temperatures are below about 115° C., more preferably below about 105° C.

The polymerization temperature used in the process is in part determined by the density of the copolymer to be produced. More in particular, the melting point of the copolymer depends on the copolymer density. The higher the density of the copolymer, the higher its melting point. Therefore, lower density copolymers are produced at lower temperatures to avoid melting or sintering of the copolymer particles being produced in the reactor. Thus, without limiting the present invention, copolymers having densities below about 0.92 g/cm$^3$ are polymerized at a temperature preferably above about 60° C., but preferably below about 90° C. Copolymers having densities of about 0.92 to about 0.94 g/cm$^3$ are polymerized at a temperature preferably above about 70° C., but preferably below about 100° C. When a fluidized-bed reactor is used, the person of ordinary skill in the art is readily able to determine appropriate pressures to use. Fluidized-bed reactors can be operated at pressures of up to about 1000 psi or more, and are generally operated at pressures below about 350 psi. Preferably, fluidized-bed reactors are operated at pressures above about 150 psi. As is known in the art, operation at higher pressures favors heat transfer because an increase in pressure increases the unit volume heat capacity of the gas.

Once a catalyst is activated, the activated catalyst has a limited lifetime before it becomes deactivated. As is known to those of ordinary skill in the art, the half-life of an activated catalyst depends on a number of factors, such as the species of catalyst (and cocatalyst), the presence of impurities (e.g., water and oxygen) in the reaction vessel, and other factors. An appropriate length of time for carrying out a polymerization can be determined by the person skilled in the art for each particular situation.

The copolymers of the present invention contain about 5 to about 20 percent by weight of units derived from α-olefin. For example, the copolymer may contain at least about 5.5, at least about 6, at least about 7, at least about 10, at least about 12, or even at least about 15 percent by weight of units derived from at least one α-olefin. An exemplary upper limit is about 18 percent by weight.

The copolymers of the present invention are characterized by showing (a) at least two CRYSTAF peak temperatures which differ by at least about 15° C., preferably at least about 20° C., even more preferably at least about 25° C., for example by about 30° C. or even higher, and/or (b) at least two DSC melting peak temperatures which differ by at least about 15° C., preferably at least about 20° C., for example by about 25° C. or even higher. Preferred copolymers of the present invention show the minimum differences indicated above in both the CRYSTAF and the DSC melting peak temperatures. Also, in the preferred copolymers of the present invention at least one CRYSTAF peak appears in the temperature range of from about 75° C. to about 95° C. Additionally or alternatively, at least one DSC melting peak temperature is in the range of from about 115° C. to about 135° C. The procedures to be used for the determination of the CRYSTAF peak and DSC melting peak temperatures of a copolymer sample are described in detail in the experimental section below.

The differences in the at least two CRYSTAF peaks and the at least two DSC melting peak temperatures, respectively, are an indication that the comonomer α-olefin) contents in the first component produced by the non-single-site polymerization catalyst and the second component produced by the single-site polymerization catalyst differ significantly. In particular, the comonomer incorporation rate of the single-site polymerization catalyst is higher than the comonomer incorporation rate of the non-single-site polymerization catalyst. This difference has a pronounced effect on the properties of the corresponding copolymer only because at the same time, the comonomer content of the entire copolymer is high, i.e., at least about 5 weight percent and up to about 20 weight percent. Only this high comonomer content of the copolymer of the present invention can bring about a significant absolute difference in comonomer content of the individual components thereof, i.e., the component produced by the non-single-site polymerization catalyst (e.g., Ziegler catalyst) and the component produced by the single-site polymerization catalyst (e.g., metallocene-based catalyst). This difference translates into significantly different properties of the individual copolymer components, the more so since single-site polymerization catalysts usually incorporate α-olefin comonomer in a much more uniform manner into the copolymer molecule than non-single-site polymerization catalysts such as conventional Ziegler-Natta catalysts, which results in, e.g., a different crystallization behavior (for example, a Ziegler catalyzed copolymer component may be expected to have a higher crystallization tendency than a metallocene catalyzed copolymer component).

Copolymers of the present invention which have an essentially unimodal molecular weight distribution, i.e., wherein the average molecular weights of the individual components thereof are similar so as to result in a quasi-unimodal instead of a bimodal molecular weight distribution of the copolymer (as evidenced by, e.g., a single peak in the gel permeation chromatogram, as opposed to two distinct (distinguishable) peaks in the case of a "true" bimodal distribution, see e.g., FIG. 4) are particularly preferred. An advantage of the catalyst combinations preferably used according to the present invention is that the single-site catalyst produces a comparatively high molecular weight copolymer component at a given molar ratio of ethylene and hydrogen or produces a copolymer component having a molecular weight which is close to that of the copolymer component produced by the non-single-site polymerization catalyst, respectively.

The density of copolymers of the present invention is to a large part determined by the amount of α-olefin comonomer(s) in the copolymer molecule. In order to achieve the CRYSTAF and DSC melting peak temperature differences discussed above, enough α-olefin comonomer is to be copolymerized with ethylene to achieve a level of at least about 5 weight percent of the α-olefin comonomer(s) in the copolymer. The amount of comonomer needed to achieve a predetermined density depends, inter alia, on the particular α-olefin(s) being employed. Further, the various contemplated α-olefins have different reactivity rates, relative to the reactivity rate of ethylene, with respect to the copolymerization thereof with the polymerization catalysts. Therefore, the amount of a specific α-olefin to be fed to the reactor in order to achieve a predetermined comonomer concentration in the copolymer will also depend on the reactivity of that α-olefin.

According to the present invention it is preferred to polymerize ethylene and at least one α-olefin, particularly 1-hexene, to obtain copolymers having a density of not higher than about 0.93 g/cm$^3$, more preferably not higher than about 0.925 g/cm$^3$, e.g., not higher than about 0.92 g/cm$^3$. While there is no particular lower density limit, the density of the copolymer of the present invention will usually not be lower than about 0.89 g/cm$^3$, preferably not lower than about 0.90 g/cm$^3$. Of course, other ethylenically unsaturated comonomers may also be present in the copolymers of the invention (resulting in terpolymers, tetrapolymers, etc.), but preferably in amounts not higher than about 2 weight %, more preferably not higher than about 1 weight %.

The melt index (MI) of the present copolymers is preferably at least about 0.1 g/10 min, more preferred at least about 0.2 g/10 min, but preferably not higher than about 100 g/10 min, and particularly not higher than about 50 g/10 min. The melt flow ratio (MFR, flow index/melt index, as determined according to ASTM D1238 at 190° C. at a load of 21.6 and 2.16 kg, respectively) of the copolymers of the present invention preferably is at least about 17, more preferably at least about 20, but preferably not higher than about 100, more preferably not higher than about 70, e.g., not higher than about 60.

Additionally, the molecular weight distribution of the copolymers of the present invention, expressed as $M_w/M_n$ (weight average molecular weight/number average molecular weight, as determined by gel permeation chromatography, see experimental section below for details) preferably is at least about 2.5, more preferably at least about 3.0, but preferably not higher than about 10, more preferably not higher than about 9, e.g., not higher than about 7. The copolymers of the present invention are particularly suitable for the manufacture of film, e.g., blown film. Other articles for the manufacture whereof the copolymers of the present invention may advantageously be used include extruded articles such as sheets as well as molded articles such as articles made by injection molding or blow molding.

In general, the ethylene/α-olefin copolymers of the present invention are preferably extruded or blown into films. For example, films can be produced which are about 0.2 to 10 mils, preferably about 0.5 to 5 mils in thickness.

The present copolymers may be combined with various additives conventionally added to polymer compositions, such as lubricants, fillers, stabilizers, antioxidants, compatibilizers, pigments, etc. Many additives can be used to stabilize the products. For example, additive packages comprising hindered phenol(s), phosphites, antistats and stearates, for addition to resin powders, can be used for pelletization.

BRIEF DESCRIPTION OF THE DRAWINGS

The present invention is further described in the detailed description which follows, in reference to the noted plurality of drawings by way of non-limiting examples of exemplary embodiments of the present invention. In the drawings.

The following Examples further illustrate the essential features of the present invention. However, it will be apparent to those skilled in the art that the specific reactants and reaction conditions used in the Examples do not limit the scope of the present invention.

The properties of the polymers produced in the Examples were determined as follows:
Analysis of the Resin Produced Prior to testing the polymers are processed as described below. Additives—1000 ppm each of Irganox™ 1010 (hindered phenol antioxidant) and Irgafos™ 168 (phosphite antioxidant), both produced by CK Witco Corp., and 500 ppm AS900 (antistatic agent manufactured by Ciba-Geigy, Switzerland), are dry blended with the granular resin. The mixture is then melt mixed using either a Brabender twin screw compounder (¾" screw diameter) at melt temperatures of less than 200° C., with a nitrogen purge to the feed throat, or a 40 gram Brabender batch mixer.

The Flow Index (FI), g/10 min, at 190° C. was determined as specified in ASTM D 1238 using a load of 21.6 kg.

The Melt Index (MI), g/10 min, at 190° C. was determined as specified in ASTM D 1238 using a load of 2.16 kg.

The density (g/cm$^3$) was determined as specified in ASTM D 1505-68 with the exception that the density measurement is taken 4 hours instead of 24 hours after the sample is placed in the density column.

Tensile strength values (tensile yield, ultimate tensile strength, elongation at break and elongation at yield) were measured (machine direction ("MD") and transverse direction ("TD")) in accordance with ASTM D882-97. The film gauge was measured using ASTM D5947-96 Method C.

1% Secant (both MD and TD) was determined in accordance with ASTM D882-97.1% Flex was determined according to ASTM D-790A.

Elmendorf tear was determined in accordance with ASTM D1922-94a.

Dart Impact Strength (sometimes termed "dart drop") was measured in accordance with ASTM D1709 Method A, at 26 inches (66 cm).

Gloss was measured according to ASTM D-2457.

Figure 1:
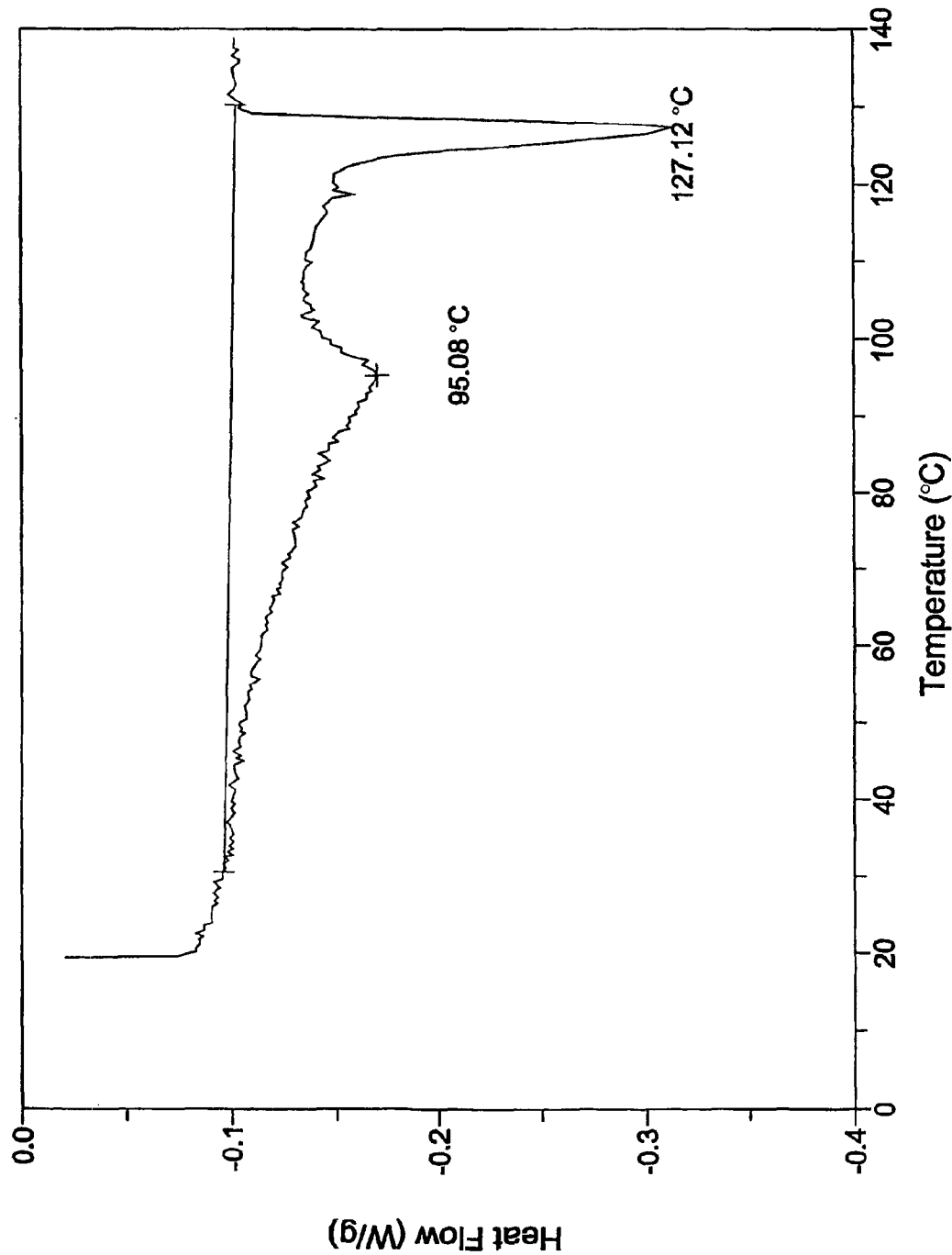
FIG. 1 shows a DSC (differential scanning calorimetry) curve of the copolymer produced in Polymerization Example 1.
Figure 3:
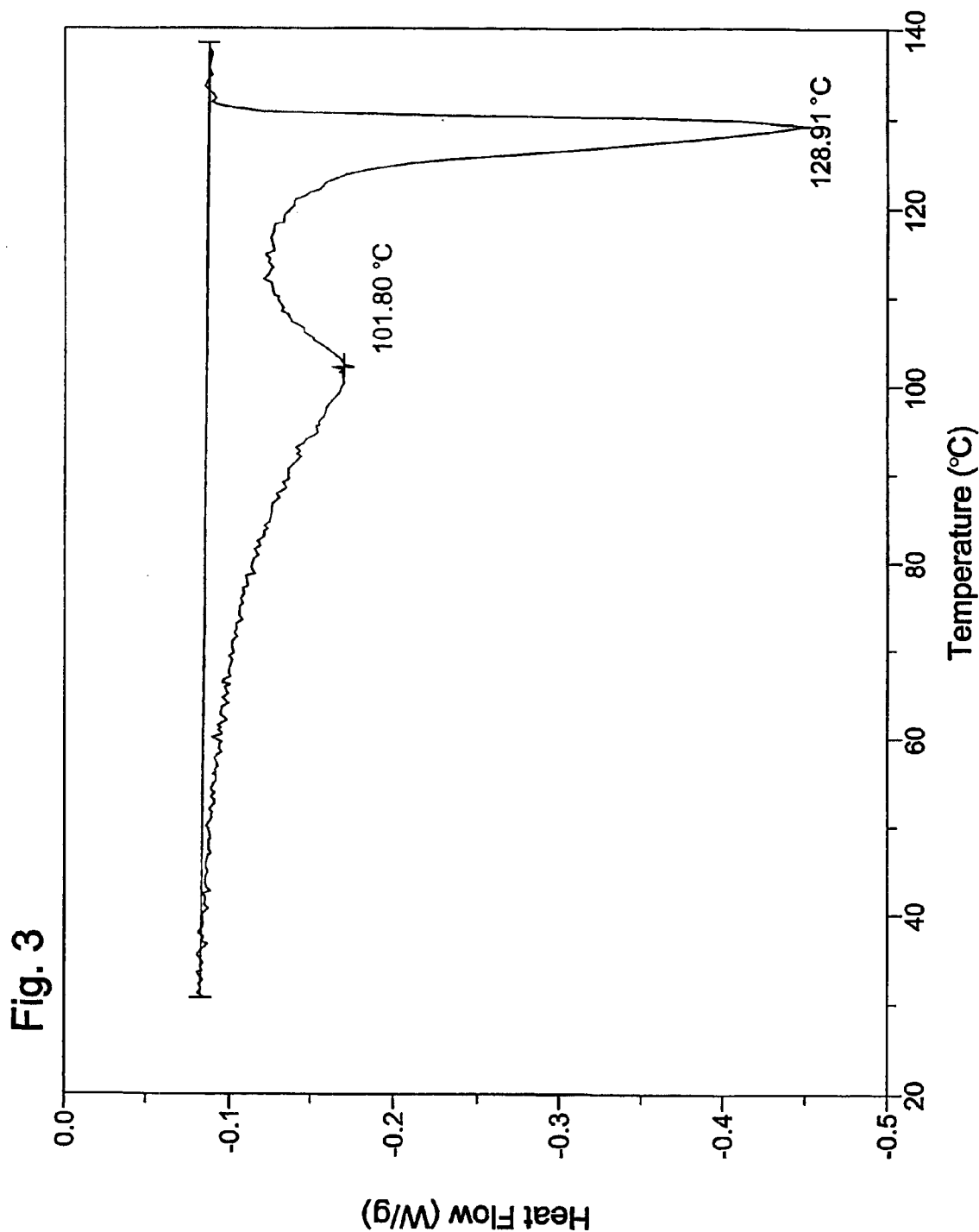
FIG. 3 shows a DSC curve of the copolymer produced in Polymerization Example 2.

Haze was measured according to ASTM D-1003.
CRYSTAF Peak Temperature Determination The CRYSTAF Peak Temperature Determination is conducted using a CRYSTAF instrument available from PolymerChar (Valencia, Spain). The copolymer sample is dissolved at 150° C. in trichorobenzene to a concentration of 0.1 weight percent. The copolymer is dissolved at this temperature for 45 minutes. The solution is then kept at 100° C. for 30 minutes, whereafter it is cooled to 30° C. at a rate of 0.2° C./min. At regular intervals during cooling an infrared detector measures the concentration of polymer in solution. A curve of polymer concentration as function of temperature is obtained. The derivative of this curve is the the comonomer distribution. Highly branched species correspond to a low temperature peak while less branched species are represented by a high temperature peak. The copolymers of the present invention, prepared as described below, display (at least) two distinct peaks, indicating a bimodal comonomer distribution.
DSC Melting Curves The samples are first heated to 150° C. and then cooled at a rate of 0.5° C./min. Thereafter, the melting endotherm is generated by heating the samples from 40–140° C. at a rate of 2° C./min, thereby determining the peak melting temperature. Highly branched (more comonomer) copolymer species will melt at a low peak temperature while unbranched (no comonomer) polymer species will melt at high temperature. The present copolymers typically will display two peaks, suggesting a bimodal comonomer distribution. FIGS. 1 and 3 illustrate melting endotherms as measured by DSC.

Comonomer Content

Comonomer content is measured by an infrared spectroscopic method described in T. E. Nowlin, Y. V. Kissin and K. P. Wagner, "High Activity Ziegler-Natta Catalyst for the Preparation of Ethylene Copolymers", Journal of Polymer Science: Part A; Polymer Chemistry, vol. 26, pages 755–764 (1988), the disclosure whereof is expressly incorporated herein by reference in its entirety.

Molecular Weight Distribution

The molecular weight distribution is determined by a standard Gel Permeation Chromatography (GPC) technique using a Waters 150 C high temperature GPC. The polymer solution is prepared in trichlorobenzene at a concentration of 0.1 percent. Four high temperature columns with pore sizes of 1E3, 1E4 and 2×1E6 are used. Narrow MWD polystyrene calibration standards are used to generate a calibration curve which is converted to equivalent polyethylene molecular weights using the universal calibration curve and Mark Houwink constants.

EXPERIMENTS

Catalyst Preparation Example 1

(a) Under an inert atmosphere, 8.018 g of Davison grade 955 silica was placed into a 300 ml pear flask containing a magnetic stirring bar. The silica was previously calcined for 12 hours at 600° C. under dry nitrogen. The flask was then placed into a silicone oil bath set at 55° C. and then 100–150 ml of dry heptane was added to the flask. The contents of the flask were stirred and 7.0 ml of a 0.829 Molar solution of dibutylmagnesium (DBM) in heptane was added to the flask using a syringe and stirring was continued for two hours. Next, 4.40 ml of a 1.254 Molar solution of 1-butanol in heptane was added to the flask and stirring continued for 2 h, all at about 55° C. Then, 3.60 ml of a 0.959 Molar solution of TiCl$_4$ in heptane was added to the flask and stirring continued for 2 h. Finally, the solvents were removed with a nitrogen purge for two hours to yield 9.236 g of a light tan free-flowing powder. Ti found: 1.69 wt %; Mg found 1.49 wt %.

(b) Under an inert atmosphere, 0.082 g of rac-ethylenebis(indenyl)zirconium dichloride was added to a 10 ml serum bottle, followed by 5.0 ml (4.795 g) of a toluene solution of methylalumoxane containing 13.4 wt % Al. The contents of the serum bottle were shaken vigorously to afford Solution A.

(c) Under an inert atmosphere, 2.68 g of the powder of (a) above was added to a 200 ml flask containing a magnetic stirring bar and approximately 25 ml of dry heptane was added to the flask. While stirring the contents of the flask at room temperature, 2.4 ml of Solution A (see (b) above) was added dropwise to the flask. The contents of the flask were stirred for one hour, then the flask was placed into an oil bath at 40° C. and solvents were removed with a nitrogen purge for about two hours. After this time, 3.23 g of a free-flowing powder was obtained.

Catalyst Preparation Example 2

(a) Under an inert atmosphere, 0.086 g of dimethylsily(cyclopentadienyl) (9-fluorenyl)zirconium dichloride was added to a 10 ml serum bottle followed by 5.0 ml (4.738 g) of a toluene solution of methylalumoxane containing 13.4 wt % Al. The contents of the serum bottle were shaken vigorously to afford Solution B.

(b) Under an inert atmosphere, 2.59 g of the powder described in Catalyst Preparation Example 1(a) was added to a 200 ml flask containing a magnetic stirring bar, and approximately 25 ml of dry heptane was added to the flask. While stirring the contents of the flask at room temperature, 4.0 ml of Solution B (see (a) above) was added dropwise to the flask. The contents of the flask were stirred for 1.5 hours, then the flask was placed into an oil bath at 40° C. and solvents were removed with a nitrogen purge for about two hours. After this time, 3.60 g of a free-flowing powder was obtained.

Polymerization Example 1

An ethylene/1-hexene copolymer was prepared with the catalyst of Catalyst Preparation Example 1. A 1.6 liter stainless steel autoclave, equipped with a turbine stirrer, and under a slow nitrogen purge at 46° C. was filled with 500 ml of dry heptane and 200 ml of 1-hexene, followed by 1.1 ml of a 2.0 Molar solution of trimethylaluminum in heptane. The reactor was closed and the stirring speed was set at 900 rpm the internal temperature was increased to 95° C., and the internal pressure was increased from 10 psi to 23 psi by the addition of hydrogen. Then, ethylene was introduced to the reactor and the internal pressure was increased to 210 psi. Finally, 0.0336 g of the catalyst prepared in Catalyst Preparation Example 1 was added to the autoclave. The reactor pressure was maintained at 210 psi for 30 minutes after which the ethylene flow to the reactor was stopped and the reactor was cooled to room temperature. The contents of the autoclave were removed and all solvents were evaporated to yield 102.3 g of copolymer.

Polymerization Example 2

An ethylene/1-hexene copolymer was prepared with the catalyst of Catalyst Preparation Example 2. A 1.6 liter stainless steel autoclave, equipped with a turbine stirrer, and under a slow nitrogen purge at 46° C. was filled with 750 ml of dry heptane and 120 ml of 1-hexene, followed by 1.1 ml of a 2.0 Molar solution of trimethylaluminum in heptane. The reactor was closed and the stirring speed was set at 900 rpm, the internal temperature was increased to 85° C., and the internal pressure was increased from 6 psi to 26 psi by the addition of hydrogen. Then, ethylene was introduced to the reactor and the internal pressure was increased to 210 psi. Finally, 0.0301 g of the catalyst prepared in Catalyst Preparation Example 2 was added to the autoclave. The reactor pressure was maintained at 202 psi for 60 minutes after which the ethylene flow to the reactor was stopped and the reactor was cooled to room temperature. The contents of the autoclave were removed and all solvents were evaporated to yield 62.2 g of copolymer.

The data collected from the copolymers of Polymerization Examples 1 and 2 is summarized below in Table I.

TABLE I

| Polym. Ex. No. | MI g/10 min | FI g/10 min | MFR (FI/MI) | 1-Hexene mol % (*) | Density g/cm$^3$ |
| --- | --- | --- | --- | --- | --- |
| 1 | 4.2 | 169 | 40 | 4.05 | 0.916 |
| 2 | 1.1 | 29.2 | 27 | 2.40 | n.d. |

(*) mol % 1-hexene in the total polymer sample
n.d. = not determined

Figure 2:
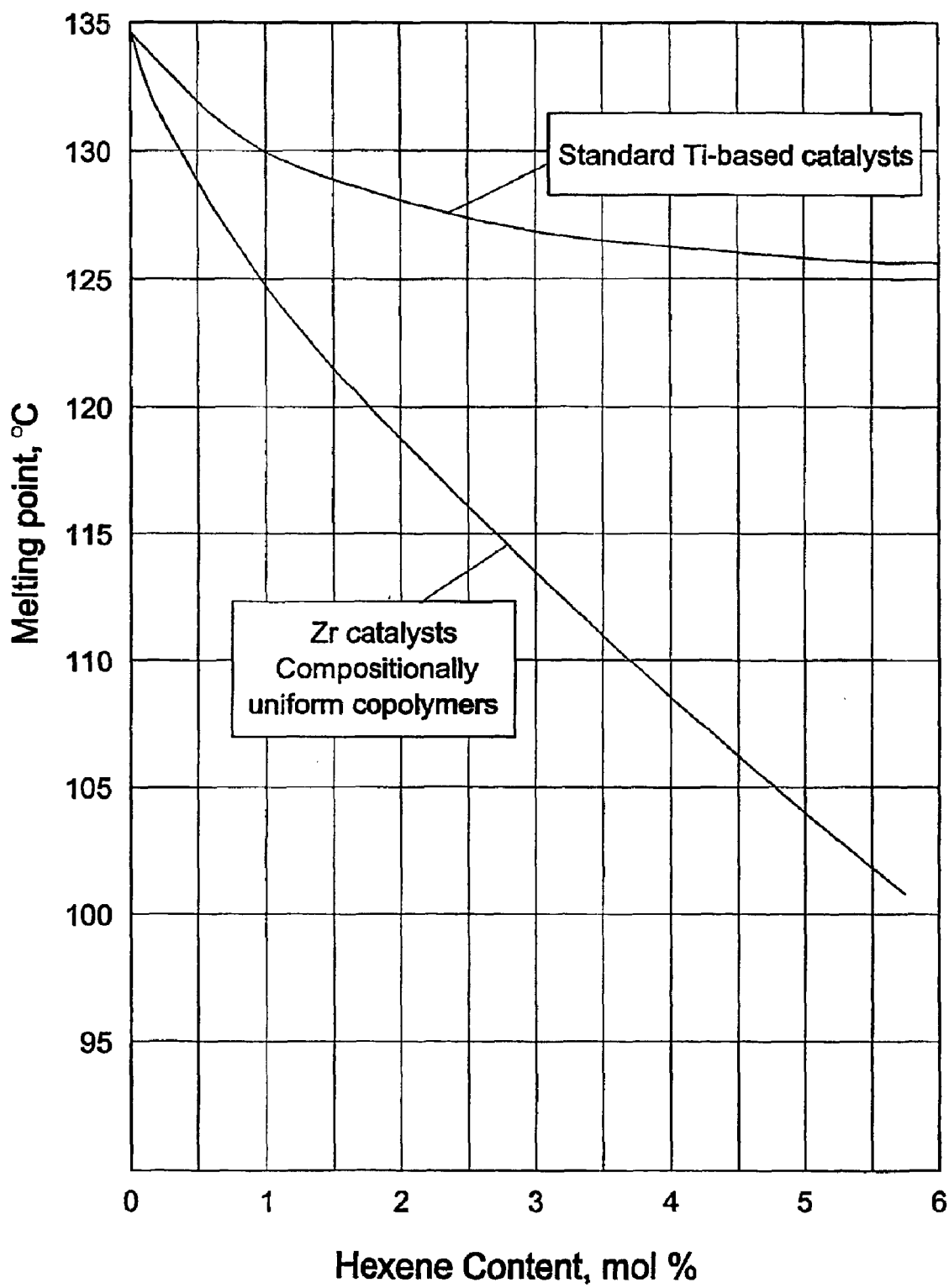
FIG. 2 shows the melting points of ethylene/1-hexene copolymers produced by Ti Ziegler catalysts on the one hand and zirconocene catalysts on the other hand as a function of the 1-hexene concentration.

The DSC data on the copolymer prepared in Polymerization Example 1 showed two melting points (FIG. 1), one peak at 95.08° C. and a second peak at 127.12° C. The melting point as a function of the amount of 1-hexene in the copolymer is shown in FIG. 2 for polymer produced by the zirconium and the titanium active centers, respectively. Based on the melting points determined by DSC as shown in FIG. 1 and the calibration curves of FIG. 2, it can be calculated that the copolymer produced in Polymerization Example 1 is an in situ blend of copolymer provided by the zirconium active site which contains about 7.0 mol % units derived from 1-hexene and the copolymer provided by the titanium active site which contains about 2.7 mol % units derived from 1-hexene. Therefore, approximately 70% and 30% of the total copolymer was produced by the titanium and zirconium active centers, respectively.

Figure 4:
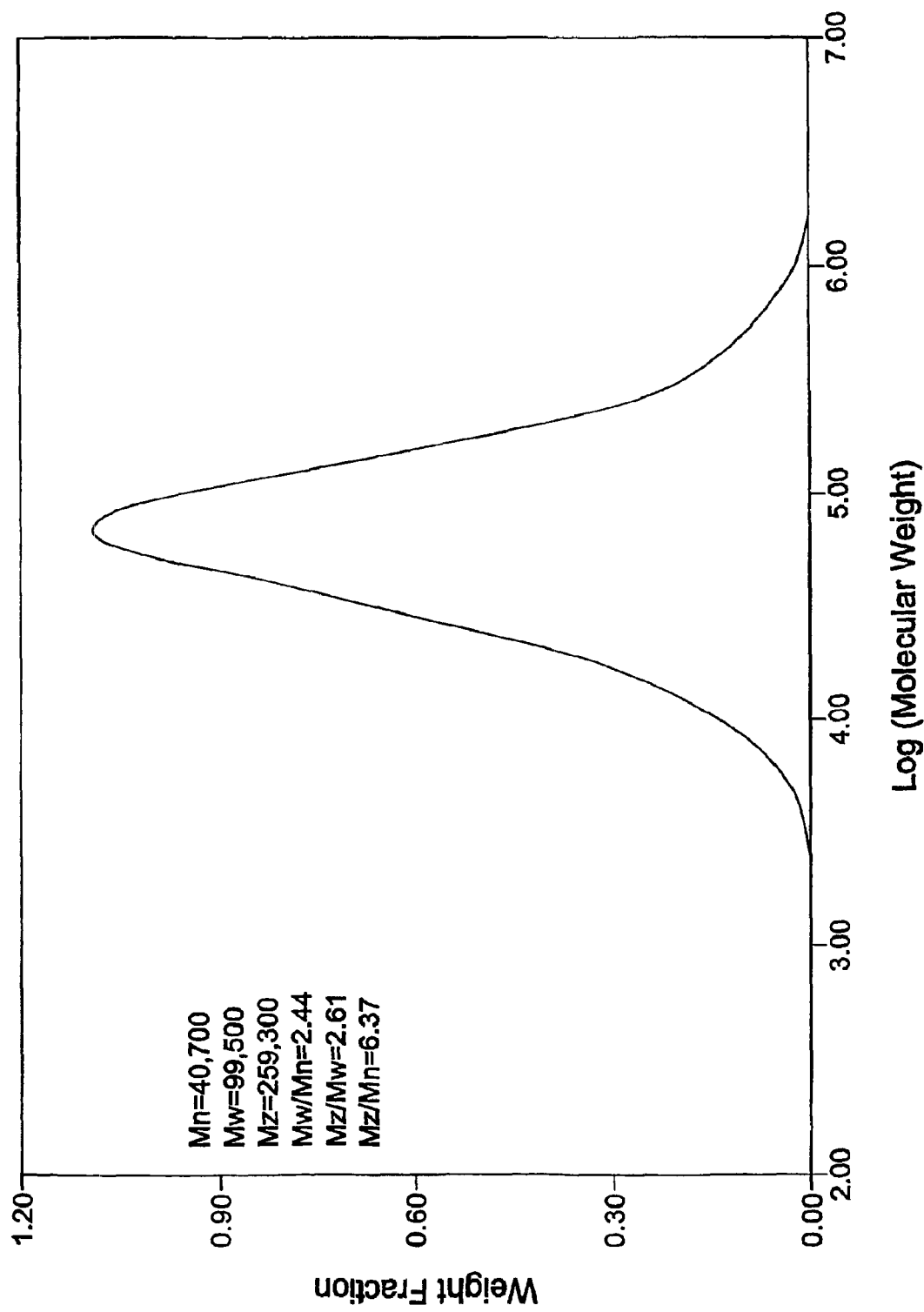
FIG. 4 shows a GPC curve of the copolymer produced in Polymerization Example 2.
Figure 5:
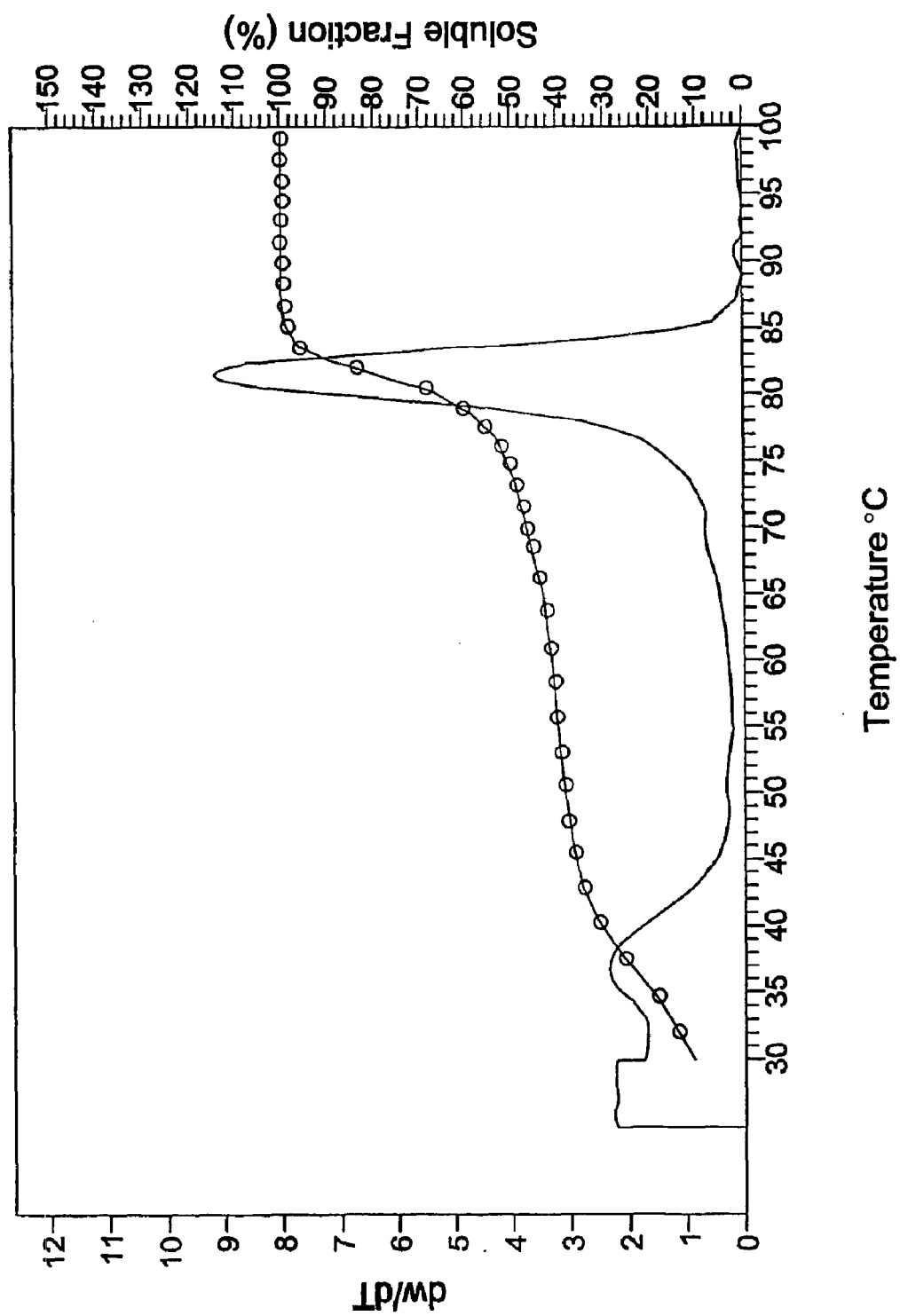
FIG. 5 shows a CRYSTAF curve of the blended copolymers produced in Polymerization Examples 3 and 4.
Figure 6:
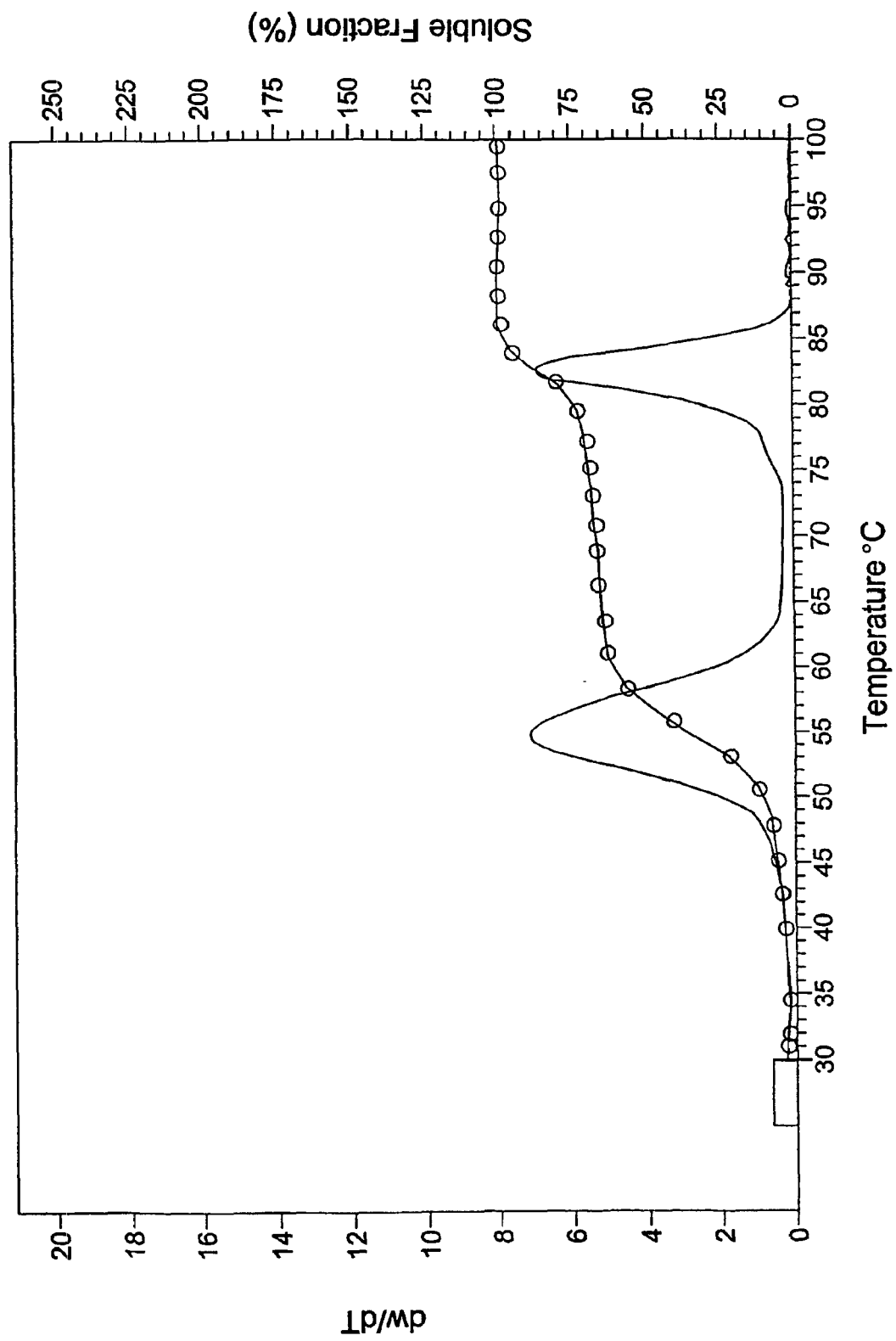
FIG. 6 shows a CRYSTAF curve of the copolymer produced in Polymerization Example 2.

The DSC data on the polymer prepared in Polymerization Example 2 showed two melting points (FIG. 3), one peak at 101.8° C. and a second peak at 128.91° C. Hence, the polymer produced in Polymerization Example 2 is an in situ blend of copolymer provided by the zirconium active site which contains about 5.5 mol % units derived from 1-hexene and the copolymer provided by the titanium active site which contains about 1.5 mol % units derived from 1-hexene. Therefore, approximately 78% and 22% of the copolymer prepared in Polymerization Example 2 was produced by the titanium and zirconium active centers, respectively. The GPC of the copolymer of Polymerization Example 2 indicates a unimodal molecular weight distribution (FIG. 4), suggesting that the two catalysts produced polymers with similar average molecular weights.

Catalyst Preparation Example 3

(a) 6.673 g of Davison Grade 955 silica previously calcined at 600° C. for 4 hours was added to a 300 ml flask containing a magnetic stir bar. Next, about 100 ml of dry heptane was added to the flask, and the flask was placed into an oil bath at 55° C. Dibutylmagnesium (6.0 ml of a 0.801 Molar solution in heptane) was added to the flask and the contents were stirred for 60 minutes. Next, 3.64 ml of 1-butanol (1.254 Molar solution in heptane) was added to the flask and stirring continued for 60 minutes. Finally, 3.0 ml of a 0.959 Molar solution of titanium tetrachloride in heptane was added to the flask, all at about 55° C. After 60 minutes all solvents were removed under a nitrogen purge to yield 7.58 g of a dry powder. Ti (found) 1.79 wt %.

(b) 0.086 g of dimethylsilyl(cyclopentadienyl)(9-fluorenyl)zirconium dichloride was added to a 10 ml serum bottom followed by 4.738 grams of a methylalumoxane/toluene solution containing 13.4 wt % aluminum, affording Solution C.

(c) 2.59 g of the titanium catalyst component of step (a) above were placed into a 200 ml flask containing a magnetic stir bar and about 35 ml of heptane. At room temperature and with very good mixing, 4.0 ml of Solution C of (b) above was added dropwise to the flask. Stirring was continued for 1.5 hours and then the flask was placed into an oil bath at 40° C. and solvents were removed under a nitrogen purge to yield 3.60 g of a purple powder. Analytical results: Al, 12.8 wt %, Mg, 0.93 wt %, Ti 1.11 wt %, Zr, 0.32 wt %.

Polymerization Example 3

A 1.6 liter stainless autoclave under a slow nitrogen purge at 41° C. was filled with 750 ml of dry heptane and 200 ml of dry 1-hexene, followed by the addition of 1.1 ml of a 2.0 Molar solution of trimethylaluminum in hexane. The reactor was closed and stirring speed was set at 900 rpm, the internal temperature was increased to 83° C., and the internal pressure was increased from 6 psig to 23 psig with the addition of hydrogen. Ethylene was introduced to maintain an internal pressure of 210 psig and then 0.0271 g of the catalyst prepared in Catalyst Preparation Example 3 was injected into the reactor. The internal temperature was maintained at 85° C. for one hour and then the ethylene flow to the reactor was stopped and the reactor cooled to room temperature. 54.8 g of copolymer was isolated from the reactor. The copolymer contained 3.4 mol % units derived from 1-hexene and exhibited a Flow Index of 33.3 g/10 min and a Melt Index of 1.04 g/10 min.

Polymerization Example 4

A 1.6 liter stainless steel autoclave under a slow nitrogen purge at 36° C. was filled with 750 ml of dry heptane and 200 ml of dry 1-hexene, followed by the addition of 1.1 ml of a 2.0 Molar solution of trimethylaluminum in hexane. The reactor was closed and the stirring speed was set at 900 rpm, the internal temperature was increased to 84° C., and the internal pressure was increased from 6 psig to 26 psig with the addition of hydrogen. Ethylene was introduced to maintain an internal pressure of 210 psig and then 0.0285 g of the catalyst prepared in Catalyst Preparation Example 3 was injected into the reactor. The internal temperature was maintained at 85° C. for one hour and then the ethylene flow to the reactor was stopped and the reactor cooled to room temperature. 61.1 g of copolymer was isolated from the reactor. The copolymer contained very similar resin characteristics compared to that of Polymerization Example 3.

The copolymers produced in Polymerization Examples 3 and 4 were combined into one product sample.

Polymerization Example 5

A 1.6 liter stainless steel autoclave under a slow nitrogen purge at 45° C. was filled with 750 ml of dry heptane and 200 ml of dry 1-hexene, followed by the addition of 1.1 ml of a 2.0 Molar solution of trimethylaluminum in hexane. The reactor was closed and the stirring speed was set at 900 rpm, the internal temperature was increased to 85° C., and the internal pressure was increased from 6 psig to 22 psig with the addition of hydrogen. Ethylene was introduced to maintain an internal pressure of 210 psig and then 0.0301 g of the catalyst of Catalyst Preparation Example 3 was injected into the reactor. The internal temperature was maintained at 85° C. for one hour and then the ethylene flow to the reactor was stopped and the reactor cooled to room temperature. 70.5 g of copolymer was isolated from the reactor. The copolymer contained 3.4 mol % units derived from 1-hexene and exhibited a Flow Index of 14.0 g/10 min and a Melt Index of 0.48 g/10 min.

Polymerization Example 6

A 1.6 liter steel autoclave under a slow nitrogen purge at 46° C. was filled with 750 ml of dry heptane and 200 ml of dry 1-hexene, followed by the addition of 1.1 ml of a 2.0 Molar solution of trimethylaluminum in hexane. The reactor was closed and the stirring speed was set at 900 rpm, the internal temperature was increased to 85° C., and the internal pressure was increased from 7 psig to 22 psig with the addition of hydrogen. Ethylene was introduced to maintain an internal pressure of 210 psig and then 0.0276 grams of the catalyst of Catalyst Preparation Example 3 was injected into the reactor. The internal temperature was maintained at 85° C. for one hour and then the ethylene flow to the reactor was stopped and the reactor cooled to room temperature. 50.9 grams of copolymer was isolated from the reactor. The copolymer contained 3.0 mol % 1-hexene and exhibited a Flow Index of 10.8 g/10 min and a Melt Index of 0.34 g/10 min.

The copolymers produced in Polymerization Examples 5 and 6 were combined into one product sample.

Catalyst Preparation Example 4

51.5 g of a titanium catalyst component (prepared in the same manner as in Catalyst Preparation Example 3 above) was added to a one liter round bottom flask containing a magnetic stir bar, followed by approximately 500 ml of dry isohexane. 1.35 g of dimethylsily(cyclopentadienyl)(9-fluorenyl)zirconium dichloride was placed in a small glass bottle and then 72.0 grams of a methylalumoxane/toluene solution which contained 13.4 wt % Al was added thereto. The Zr compound/MAO solution was shaken and then 65 g of this solution was transferred to an addition funnel. The addition funnel was connected to the one liter flask and the Zr/MAO solution was added dropwise (over 10 minutes) to the flask while the contents of the flask were stirred. After this addition, the contents of the flask were stirred at room temperature for 70 minutes and then the flask was placed in an oil bath (45–55° C.) and solvents were removed with a nitrogen purge over 5.7 hours. 76 g of a purple solid were isolated which contained 10.7 wt % Al; 0.95 wt % Mg; 1.21 wt % Ti, and 0.26 wt % Zr.

Catalyst Preparation Example 5

315 g of a titanium catalyst component (prepared in the same manner as in Catalyst Preparation Example 3 above) was added to a one-gallon glass catalyst preparation vessel containing a double helix stirrer and fitted with a heating jacket. Next, approximately 1575 ml of dry isopentane was added to the glass vessel. Then, under an inert atmosphere, 8.20 g of dimethylsilyl(cyclopentadienyl)(9-fluorenyl) zirconium dichloride was added to a one-liter glass bottle, followed by 440 grams (480 ml of solution) of a methylalumoxane/toluene solution which was 4.56 Molar in Al. The Zr compound/MAO solution was shaken and then this solution was transferred to a stainless steel Hoke bomb. The Hoke bomb was connected to the one-gallon glass preparation vessel and the Zr/MAO solution was added at room temperature in small aliquots (at one minute intervals over 28 minutes) to the glass preparation vessel while the contents of the vessel were stirred. After this addition, the contents of the flask were stirred at room temperature for about 5 hours and then the glass vessel was heated to about 45° C. and solvents were removed with a nitrogen purge over about 14 hours. 340 g of a purple solid were isolated.

Preparation of Ethylene/1-Hexene Copolymers in the Gas Phase

For Polymerization Examples 7–10, all work was performed in a continuous gas phase fluidized bed reactor, which can nominally produce copolymer at a rate of 3 pounds per hour.

Polymerization Example 7

Catalyst of Catalyst Preparation Example 4 was fed to the reactor at a rate sufficient to produce copolymer at a rate of approximately 2.50 pounds per hour. The reactor was operated at a total pressure of approximately 325 psia. Time averaged values for reactor composition were: ethylene 95.0 psi, 1-hexene 11.0 psi, hydrogen 8.5 psi, nitrogen 210.5 psi. Reactor cycle gas mass flow rate was 1.2 kilopounds/h. The resulting product had a density of 0.922 g/cm$^3$ and a MI of 1.75 g/10 min.

Polymerization Example 8

Catalyst of Catalyst Preparation Example 5 was fed to the reactor at a rate sufficient to produce copolymer at a rate of approximately 2.75 pounds per hour. The reactor was operated at a total pressure of approximately 335 psia. Time averaged values for reactor composition were ethylene 140.0 psi, 1-hexene 4.2 psi, hydrogen 18.9 psi, nitrogen 171.9 psi. Reactor cycle gas mass flow rate was 1.2 kilopounds/h. The resulting product had a density of 0.932 g/cm$^3$ and a MI of 0.55 g/10 min.

Polymerization Example 9

Catalyst of Catalyst Preparation Example 5 was fed to the reactor at a rate sufficient to produce copolymer at a rate of approximately 2.40 pounds per hour. The reactor was operated at a total pressure of approximately 330 psia. Time averaged values for reactor composition were: ethylene 140.0 psi, 1-hexene 4.9 psi, hydrogen 18.9 psi, nitrogen 166.2 psi. Reactor cycle gas mass flow was 1.2 kilopounds/h. The resulting product had a density of 0.927 g/cm$^3$ and a MI of 0.76 g/10 min.

Polymerization Example 10

Catalyst of Catalyst Preparation Example 5 was fed to the reactor at a rate sufficient to produce copolymer at a rate of approximately 3.4 pounds per hour. The reactor was operated at a total pressure of approximately 335 psia. Time averaged values for reactor composition were: ethylene 145.0 psi, 1-hexene 7.0 psi, hydrogen 21.0 psi, nitrogen 162.0 psi. Reactor cycle gas mass flow rate was 1.2 kilopounds/h. The resulting product had a density of 0.922 g/cm$^3$ and a MI of 1.19 g/10 min.

Resin and blown film data for Polymerization Examples 3+4 and 5+6 plus a control produced from a conventional Ziegler-Natta catalyst are shown in Table II below.

TABLE II

| | Polym. Ex. No. | | |
|---|---|---|---|
| | 3 + 4 | 5 + 6 | Control |
| Blend Melt Index (g/10 min) | 1.5 | 0.45 | 0.9 |
| Blend MFR (FI/MI) | 25 | 28 | 25 |
| Blend Density (g/cm$^3$) | 0.913 | 0.915 | 0.916 |
| Film Properties (thickness 1.0 mil): | | | |
| Dart Drop (F50, ASTM D-1709) | 380 | 575 | 362 |
| MD Elmendorf Tear (g/mil) | 243 | 265 | 313 |
| Haze (%) | 13.3 | 12.4 | 17.5 |
| Gloss@ 45 degrees | 42.4 | 43.2 | 35.2 |
| 1% Secant Modulus | 24,000 | 27,000 | 24,500 |

The resins of Polymerization Examples 3+4 and 5+6 are unexpectedly better in both haze and gloss for their level of stiffness.

The superior balance of properties demonstrated for the copolymers of the above Polymerization Examples according to the invention may be attributed to the bimodal comonomer distribution, which resulted from the use of a non-single-site/single-site polymerization catalyst combination. The stiffness is provided by a higher density Ziegler (Ti) copolymer component while the toughness, tear and clarity are associated with the uniform comonomer distribution of the copolymer component provided by the zirconocene catalyst.

As evidence for the bimodal comonomer distribution, the CRYSTAF technique was used to characterize the copolymers of Polymerization Examples 3+4 and 2. The plot for Polymerization Examples 3+4 and 2 is illustrated in FIGS.

Figure 7:
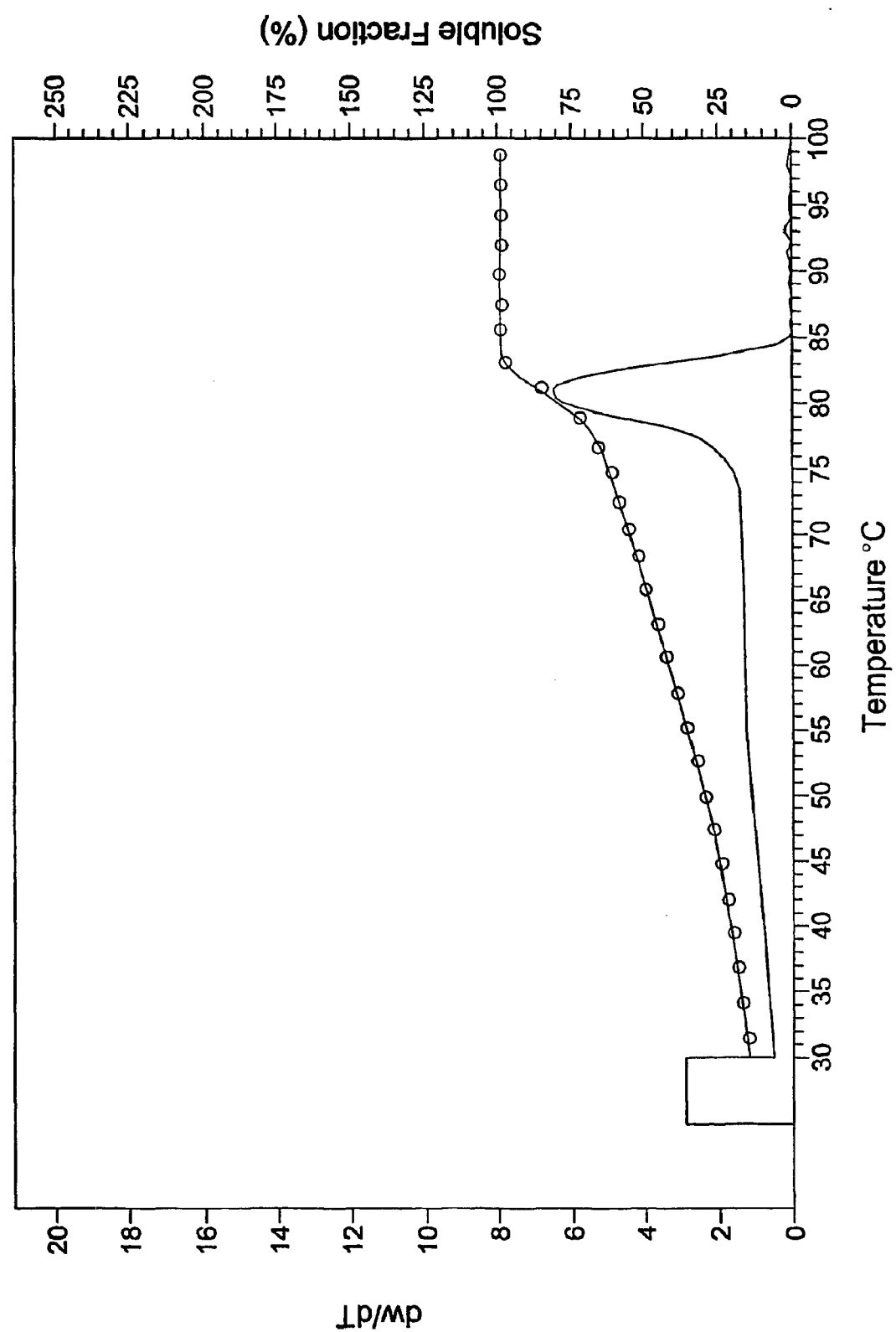
FIG. 7 shows a CRYSTAF curve of an ethylene/1-hexene copolymer produced by a conventional Ziegler (non-single-site) polymerization catalyst.

5 and 6, respectively. The peak centered around a temperature of 80° C. comes from the Ziegler (Ti) catalyzed component of the copolymer, while the broader peak at around 40° C. represents the zirconocene catalyzed component. The CRYSTAF plot for the Ziegler Control (FIG. 7) on the other hand only shows a single peak at the higher end of the temperature range.

Polymerization Examples 7–10 are all representations of this invention carried out in a single gas phase reactor. Resin properties are given in Table III below.

TABLE III

| Polym. Ex. No. | Density (g/cm³) | MI (g/10 min) | MFR |
|---|---|---|---|
| 7 | 0.922 | 1.75 | 36.1 |
| 8 | 0.932 | 0.55 | 47.0 |
| 9 | 0.927 | 0.76 | 47.4 |
| 10 | 0.921 | 1.19 | 47.9 |

Figure 8:
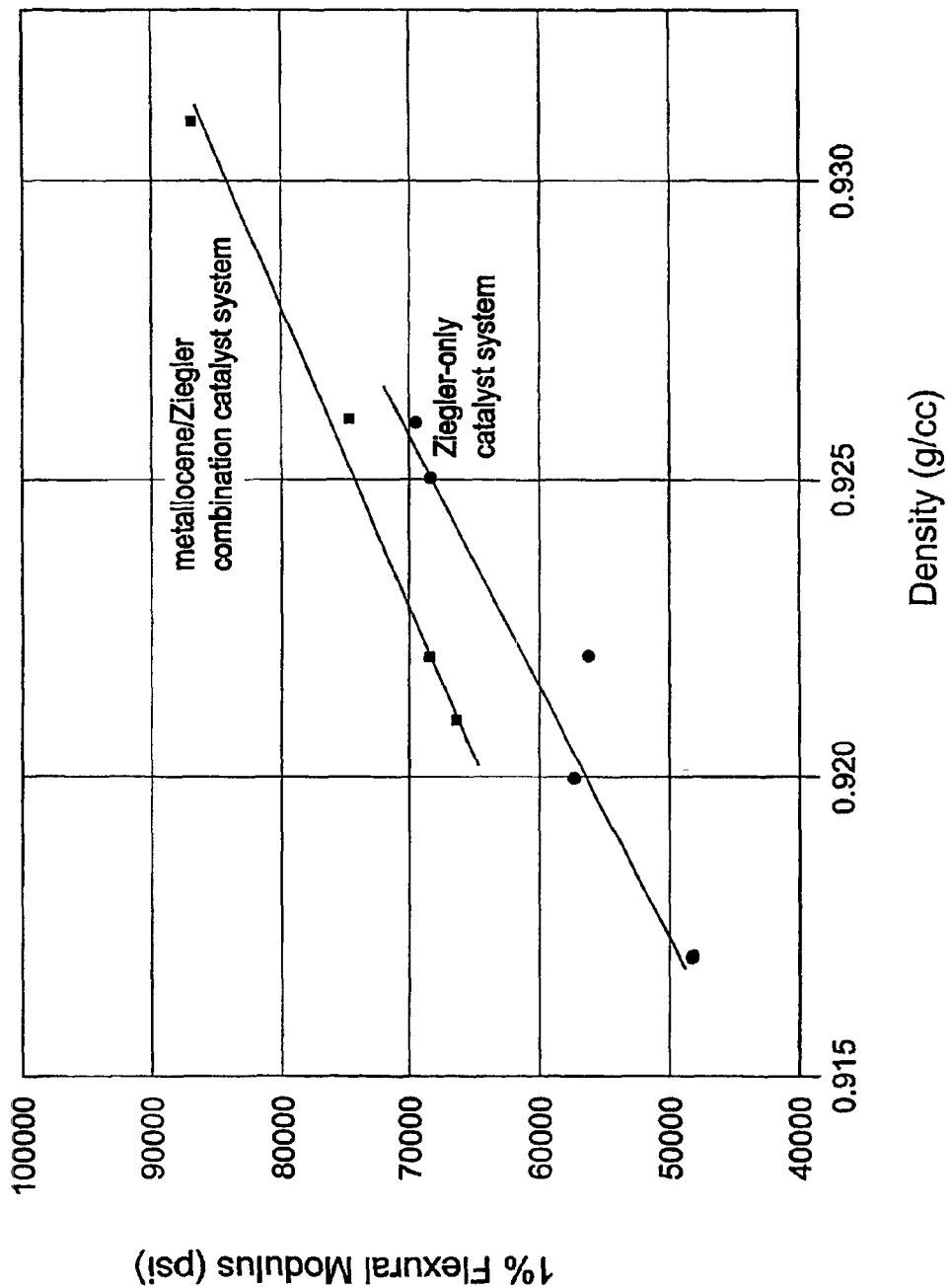
FIG. 8 shows the 1% flexural modulus as a function of density for ethylene/1-hexene copolymers in accordance with the present invention and produced by conventional Ziegler catalysts, respectively.

The superior balance of stiffness for a given density in comparison to Ziegler catalyzed copolymers is illustrated in FIG. 8. At a given density the copolymers of Polymerization Examples 7–10 provide higher flexural modulus (stiffness). Another aspect of this invention is shown in Table IV where the flexural modulus is compared with the Shore D indentation hardness. The control data is for two Ziegler catalyzed copolymers produced in the same reactor under similar conditions to achieve their respective densities. Note the unique and unexpected relationship for the copolymers of the invention where at a given hardness (Shore D), these copolymers are stiffer or alternatively, at a given stiffness are softer than the Ziegler-catalyzed copolymers.

TABLE IV

| Polym. Ex. No. | Density (g/cm³) | 1% Flex (psi) | Shore D (@ 10 sec) |
|---|---|---|---|
| 7 | 0.922 | 68,000 | 48.84 |
| 8 | 0.932 | 86,800 | 54.92 |
| 9 | 0.927 | 74,300 | 51.54 |
| 10 | 0.921 | 65,800 | 48.66 |
| Ziegler Control A | 0.922 | 55,900 | 52.62 |
| Ziegler Control B | 0.926 | 67,400 | 54.64 |

The copolymers of Polymerization Examples 7–10 and the Ziegler Control A were converted into film on a lab-scale Brabender blown film line. The film dart impact and tear strengths are shown in Table V. Compared to the film of the Ziegler Control A, the films made from the copolymers of the present invention are lower in both of these properties. The results are not surprising given the higher melt index and/or higher density of the copolymers of the invention. Additionally, there is a significant difference in density between the resin components coming from the Zr catalyst and the resin component from the Ti catalyst, which is likewise contributing to the poorer impact and tear strengths of the copolymers of Polymerization Examples 7–10. Such a density discrepancy would be expected to lead to incompatibility of the two resin components. This incompatibility would account for the diminished impact and MD tear strengths because the Zr-derived copolymer component is not interacting or toughening the Ti-derived copolymer component.

TABLE V

| Polym. Ex. No. | Gauge (mil) | Dart Impact (F50, g) | MD Tear (g/mil) | TD Tear (g/mil) |
|---|---|---|---|---|
| Ziegler Control A | 1.48 | 408 | 416 | 443 |
| 7 | 1.66 | 96 | 107 | 314 |
| 8 | 1.53 | 92 | 125 | 303 |
| 9 | 1.57 | 140 | 191 | 641 |
| 10 | 1.29 | 196 | 126 | 156 |

Tensile data is shown in Table VI. Higher ultimate elongations and lower tensile break strengths were observed for the copolymers of the invention relative to Ziegler Control A. Again these trends suggest the presence of a very low density copolymer in the copolymers according to the invention, since it is generally known to those skilled in the art, that as density decreases, elongation increases and tensile break strength decreases.

TABLE VI

| Polym. Ex. No. | Ultimate Tensile Strength | |
|---|---|---|
| | MD/TD Elongation (%) | MD/TD Break (psi) |
| Ziegler Control A | 832/552 | 7,130/6,150 |
| 7 | 868/833 | 4,010/3,700 |
| 8 | 699/924 | 5,170/3,860 |
| 9 | 877/762 | 4,730/2,370 |
| 10 | 813/934 | 4,140/2,920 |

This unusual balance of properties is again attributed to the unique polymer architecture of the copolymers of the invention. It is remarkable that such copolymers can be made in, e.g., a single slurry or gas phase reactor as opposed to blending and/or the use of dual reactors.

All patents, test procedures, and other documents cited herein, including priority documents, are fully incorporated by reference to the extent such disclosure is not inconsistent with this invention and for all jurisdictions in which such incorporation is permitted.

While the present invention has been described and illustrated by reference to particular embodiments, it will be appreciated by those of ordinary skill in the art, that the invention lends itself to many different variations not illustrated herein. For these reasons, then, reference should be made solely to the appended claims for purposes of determining the true scope of the present invention.

What is claimed is:

1. An ethylene/α-olefin copolymer comprising at least a first component produced by a non-single-site polymerization catalyst and a second component produced by a single-site polymerization catalyst, wherein the weight ratio of the first component and the second component ranges from 9:1 to 1:9, wherein the copolymer has an α-olefin content of 5 to 20 percent by weight, and wherein the copolymer shows at least one of (a) at least two CRYSTAF peak temperatures which differ by at least 15° C. and (b) at least two DSC melting peak temperatures which differ by at least 15° C.

2. The copolymer of claim 1, wherein the copolymer shows two DSC melting peak temperatures which differ by at least 20° C.

3. The copolymer of claim 1, wherein the copolymer shows two CRYSTAF peak temperatures which differ by at least 20° C.

4. The copolymer of claim 1, wherein the copolymer shows both at least two DSC melting peak temperatures which differ by at least 20° C. and at least two CRYSTAF peak temperatures which differ by at least 20° C.

5. The copolymer of claim 4, wherein the difference in CRYSTAF peak temperatures is at least 25° C.

6. The copolymer of claim 2, wherein the difference in CRYSTAF peak temperatures is at least 30° C.

7. The copolymer of claim 3, wherein the copolymer shows at least one DSC melting peak temperature in the range from 115° C. to 135° C.

8. The copolymer of claim 7, wherein the copolymer shows at least one CRYSTAF peak in the temperature range from 75° C. to 95° C.

9. The copolymer of claim 4, wherein the weight ratio of the first component and the second component ranges from 8:2 to 2:8.

10. The copolymer of claim 5, wherein the weight ratio of the first component and the second component ranges from 7:3 to 3:7.

11. The copolymer of claim 3, wherein the copolymer has an α-olefin content of at least 7 weight percent.

12. The copolymer of claim 8, wherein the copolymer has an α-olefin content of at least 10 weight percent.

13. The copolymer of claim 1, wherein the copolymer has an α-olefin content of at least 15 weight percent.

14. The copolymer of claim 5, wherein the α-olefin comprises 3 to 12 carbon atoms.

15. The copolymer of claim 7, wherein the α-olefin is selected from one or more of propene, 1-butene, 1-pentene, 4-methyl-1-pentene, 1-hexene, 1-heptene, 1-octene and 1-decene.

16. The copolymer of claim 13, wherein the α-olefin comprises 1-hexene.

17. The copolymer of claim 15, wherein the copolymer has a density of not more than 0.93 g/cm³.

18. The copolymer of claim 4, wherein the copolymer has a density of not more than 0.925 g/cm³.

19. The copolymer of claim 16, wherein the copolymer has a density of not more than 0.92 g/cm³.

20. The copolymer of claim 1, wherein the copolymer has an essentially unimodal molecular weight distribution.

21. The copolymer of claim 20, wherein the copolymer has been produced in a single reactor.

22. The copolymer of claim 21, wherein the non-single-site polymerization catalyst is derived from at least one compound selected from Ti and V compounds.

23. The copolymer of claim 22, wherein the single-site polymerization catalyst is derived from at least one metallocene transition metal compound.

24. The copolymer of claim 23, wherein the metallocene transition metal compound is selected from Ti, Zr and Hf compounds.

25. The copolymer of claim 24, wherein the metallocene transition metal compound comprises at least one compound of the general formula (II)

$$Cp_xMA_y \qquad (II)$$

wherein x is at least 2, M is selected from zirconium and hafnium, Cp is selected from optionally substituted cyclopentadienyl and optionally substituted cyclopentadienyl that is part of an aromatic polycyclic ring system, provided that at least one Cp is cyclopentadienyl that is part of an aromatic polycyclic ring system, two cyclopentadienyl moieties may be linked by a bridging group, A is selected from halogen, hydrogen, hydrocarbyl and combinations thereof, and the sum (x+y) is equal to the valence of M.

26. The copolymer of claim 25, wherein M represents zirconium.

27. The copolymer of claim 26, wherein the aromatic polycyclic ring system is selected from optionally substituted indenyl and optionally substituted fluorenyl.

28. The copolymer of claim 26, wherein x is 2 and the Cp groups are linked by a bridging group.

29. The copolymer of claim 28, wherein the bridging group includes at least one silicon atom.

30. The copolymer of claim 1, wherein the single site polymerization catalyst is based on at least one compound selected from ethylenebis(indenyl)zirconium dichloride and dimethylsilyl(cyclopentadienyl)(fluorenyl)zirconium dichloride.

31. The copolymer of claim 27, wherein the metallocene transition metal compound is used in combination with an alumoxane.

32. An ethylene/1-hexene copolymer comprising at least a first component produced by a non-single-site polymerization catalyst derived from a titanium compound and a second component produced by a single-site polymerization catalyst derived from a zirconium metallocene compound, wherein the copolymer has a 1-hexene content of 6 to 12 percent by weight, wherein the weight ratio of the first component and the second component ranges from 7:3 to 3:7, wherein the copolymer shows (a) at least two CRYSTAF peak temperatures which differ by at least 20° C. and (b) at least two DSC peak temperatures which differ by at least 20° C., and wherein the density of the copolymer is not higher than 0.925 g/cm³, wherein the zirconium metallocene compound comprises two bridged cyclopentadienyl rings, at least one of said cyclopentadienyl rings being part of an indenyl or fluorenyl moiety, the copolymer produced in a single reactor.

33. A process for making an ethylene/α-olefin copolymer comprising at least a first component and a second component, wherein the copolymer has an α-olefin content of 5 to 20 percent by weight and wherein the copolymer shows at least one of (a) at least two CRYSTAF peak temperatures which differ by at least 15° C. and (b) at least two DSC peak temperatures which differ by at least 15° C., said process comprising contacting, in a single reactor, ethylene and α-olefin under polymerization conditions and in the presence of hydrogen with a catalyst combination comprising at least one non-single-site polymerization catalyst and at least one single-site polymerization catalyst.

34. The process of claim 33, wherein the copolymer has an α-olefin content of from 5 to 15 percent by weight.

35. The process of claim 34, wherein the α-olefin comprises 1-hexene.

36. The process of claim 33, wherein the single-site catalyst is derived from at least one metallocene transition metal compound.

37. The process of claim 36, wherein catalyst combination is used together with an alkylaluminum cocatalyst.

38. The process of claim 33, wherein the catalyst combination comprises a support.

39. The process of claim 38, wherein the support comprises silica.

40. The process of claim 34, wherein the process is carried out continuously.

41. The process of claim 40, wherein the process is carried out in the gas phase.

42. The process of claim 38, wherein the process is carried out as slurry polymerization.

43. The process of claim 34, wherein the copolymer has a density of not more than 0.925 g/cm³.

44. The process of claim 39, wherein the non-single-site polymerization catalyst is derived from at least one compound selected from Ti and V compounds.

45. The process of claim 36, wherein the at least one metallocene transition metal compound comprises a compound of the general formula (II)

$$Cp_xMA_y \qquad (II)$$

wherein x is at least 2, M is selected from zirconium or hafnium, Cp is elected from optionally substituted cyclopentadienyl and optionally substituted cyclopentadienyl that is part of an aromatic polycyclic ring system, provided that at least one Cp is cyclopentadienyl that is part of an aromatic polycyclic ring system, two cyclopentadienyl moieties are linked by a bridging group, A is selected from halogen, hydrogen, hydrocarbyl and combinations thereof, and the sum (x+y) is equal to the valence of M.

46. The process of claim 37, wherein the at least one single-site polymerization catalyst is derived from at least one of ethylenebis(indenyl)zirconium dichloride and dimethylsilyl-(cyclopentadienyl)(fluorenyl)zirconium dichloride.

47. An article made from the copolymer of claim 1.

48. The article of claim 47, wherein the article is selected from blown and extruded articles.

49. A film made from the copolymer of claim 1.

50. The film of claim 49, which has a thickness of 0.2 to 10 mils.

51. The film of claim 50, wherein the copolymer contains up to 20 ppm transition metal derived from the deactivated catalyst.

52. A multilayer film comprising at least one layer made from the copolymer of claim 4.

* * * * *

UNITED STATES PATENT AND TRADEMARK OFFICE
CERTIFICATE OF CORRECTION

PATENT NO.       : 7,101,939 B2
APPLICATION NO.  : 10/497249
DATED            : September 5, 2006
INVENTOR(S)      : Thomas Edward Nowlin et al.

It is certified that error appears in the above-identified patent and that said Letters Patent is hereby corrected as shown below:

Delete the title page and substitute therefore with the attached title page showing the corrected number of claims in patent.

In the Claims:

In Claim 1, Column 26, Line 60, after 15°C -- , wherein the copolymer is made by a process comprising contacting, in a single reactor, ethylene and α-olefin under polymerization conditions with a catalyst combination comprising at least one non-single-site polymerization catalyst and at least one single-site polymerization catalyst -- inserted therefore.

In Claim 21, Column 27, Lines 42-43, should be deleted.

In Claim 22, Column 27, Line 44, "21" should be deleted, and -- 1 -- inserted therefore.

Signed and Sealed this
Twenty-ninth Day of October, 2013

Teresa Stanek Rea
*Deputy Director of the United States Patent and Trademark Office*

(12) United States Patent
Nowlin et al.

(10) Patent No.: US 7,101,939 B2
(45) Date of Patent: Sep. 5, 2006

(54) ETHYLENE/α-OLEFIN COPOLYMER MADE WITH A NON-SINGLE-SITE/SINGLE-SITE CATALYST COMBINATION, ITS PREPARATION AND USE

(75) Inventors: Thomas Edward Nowlin, West Windsor, NJ (US); Pradeep P. Shirodkar, Kingwood, TX (US); Robert Ivan Mink, Tarrytown, NY (US); Gary M. Diamond, San Jose, CA (US); Jill Helaine Paul, Whitehouse Station, NJ (US); Lawrence T. Kale, Bethel Park, PA (US); Keith Dackson, East Aurora, NY (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 27 days.

(21) Appl. No.: 10/497,249

(22) PCT Filed: Oct. 11, 2002

(86) PCT No.: PCT/US02/32806

§ 371 (c)(1),
(2), (4) Date: Nov. 3, 2004

(87) PCT Pub. No.: WO03/048213

PCT Pub. Date: Jun. 12, 2003

(65) Prior Publication Data

US 2005/0054791 A1 Mar. 10, 2005

Related U.S. Application Data

(60) Provisional application No. 60/334,566, filed on Nov. 30, 2001.

(51) Int. Cl.
C08F 4/44 (2006.01)
C08F 4/642 (2006.01)
C08F 210/16 (2006.01)

(52) U.S. Cl. .............. 526/114; 526/113; 526/118; 526/119; 526/348; 526/348.1; 526/348.5; 525/240; 428/500

(58) Field of Classification Search ............ 526/113, 526/114, 118, 119; 525/240
See application file for complete search history.

(56) References Cited

U.S. PATENT DOCUMENTS

| | | | |
|---|---|---|---|
| 2,924,593 A | 2/1960 | Breslow | 260/94.9 |
| 3,135,809 A | 6/1964 | Bosmajian | 260/650 |
| 3,242,099 A | 3/1966 | Manyik et al. | 252/429 |
| 3,950,269 A | 4/1976 | Setterquist | 252/430 |
| 4,188,470 A | 2/1980 | Collina et al. | 526/64 |
| 4,299,936 A | 11/1981 | Candlin et al. | 526/119 |
| 4,310,648 A | 1/1982 | Shipley et al. | 526/114 |
| 4,324,691 A | 4/1982 | Hartshorn et al. | 252/429 B |

(Continued)

FOREIGN PATENT DOCUMENTS

| | | |
|---|---|---|
| EP | 0286177 | 10/1988 |
| EP | 0516458 | 4/1992 |
| EP | 0515132 | 5/1992 |
| WO | WO 95/13871 | 5/1995 |

OTHER PUBLICATIONS

Stephen Brunauer, et al., "Adsorption of Gases in Multimolecular Layers", Journal of American Science, vol. 60, pp. 309–319, Feb. 1938.

T.E. Nowlin, et al., "High Activity Ziegler–Natta Catalysts for the Preparation of Ethylene Copolymers," Journal of Polymer Science: Part A: Polymer Chemistry, vol. 26, pp. 755–764, 1988.

G.G. Hlatky, "Heterogenous Single Site Catalysts for Olefin Polymerization," American Chemical Society, Chemical Review, vol. 100, pp. 1347–1376, 2000.

S.D. Ittel, et al., "Late-Metal Catalysts for Ethylene Homo-and Copolymerization," American Chemical Society, Chemical Review, vol. 100, pp. 1169–1203, 2000.

G.J.P. Britovsek, et al., "The Search for New–Generation Olefin Polymerization Catalysts: Life beyond Metallocenes," Angew. Chem. Int. Ed., vol. 38, pp. 428–447, 1999.

T. E. Nowlin, et al., "Ziegler–Natta Catalysts on Silica for Ethylene Polymerization," Journal of Polymer Science: Part A: Polymer Chemistry, vol. 29, pp. 1167–1173, 1991.

Kyung-Jun Chu et al. "Variation of Molecular Weight Distribution (MWD) and Short Chain Branching Distribution (SCBD) of Ethylene / 1–Hexene Copolymers Produced with Different in-situ Supported Metallocene Catalysts" Macromolecular Chemistry and Physics, 201(3), p. 340–348 (2000).

C. Gabriel et al. "Comparsion of Different Methods for the Investigation of the Short-Chain Branching Distribution of LLDPE" Polymer, Elsevier Science Publishers B.V., vol. 42, No. 1, pp. 297–303 (Jan. 2001).

J. D. Kim et al. "Copolymerization of Ethylene and 1-Hexene with Supported Metallocene Catalysts: Effect of Support Treatment" Macromolecular; Rapid Communications, Wiley VCH, vol. 20, No. 6, pp. 347–350 (Jun. 1999).

Kaminsky et al, "Extreme Bond Angle Distortion in Organozirconium Compounds Active Towards Ethylene" Angew. Chem. Int. Ed. Engl. vol. 15 (1976), p. 629.

(Continued)

Primary Examiner—Roberto Rabago
(74) Attorney, Agent, or Firm—Andrew B. Griffis; Amy C. Trexler

(57) ABSTRACT

An ethylene/α-olefin copolymer comprising a component produced by a non-single-site polymerization catalyst and a component produced by a single-site polymerization catalyst, its preparation and use are described. The copolymer has an α-olefin content of 5 to 20 percent by weight and shows at least two CRYSTAF peak temperatures differing by at least 15° C. and/or at least two DSC melting peak temperatures differing by at least 15° C.

51 Claims, 8 Drawing Sheets